US012619668B1

(12) United States Patent
Mishra et al.

(10) Patent No.: US 12,619,668 B1
(45) Date of Patent: May 5, 2026

(54) COMPUTER-IMPLEMENTED METHODS UTILIZING MACHINE LEARNING TO GENERATE A QUESTION AND ANSWER PAIR FOR A CONVERSATIONAL AGENT

(71) Applicant: Amazon Technologies, Inc., Redmond, WA (US)

(72) Inventors: Shaunak Mishra, Santa Clara, CA (US); Atul Kamat, Redmond, WA (US); Akshit Mehta, Toronto (CA); Brian Saltzman, Seattle, WA (US); Jeremiah Morgan, Seattle, WA (US); Jimin Patel, Sammamish, WA (US); Changwei Hu, New Providence, NJ (US); Abinand Kishore, San Ramon, CA (US); Phani Teja Anumanchupallik, Fremont, CA (US); Amjad Y. A. Abu Jbara, Bothell, WA (US); Shanmugavelayutham Muthukrishnan, New York, NY (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/893,312

(22) Filed: Sep. 23, 2024

(51) Int. Cl.
*G06F 16/9532* (2019.01)
*G06F 16/2457* (2019.01)
*G06F 40/35* (2020.01)

(52) U.S. Cl.
CPC .... *G06F 16/9532* (2019.01); *G06F 16/24578* (2019.01); *G06F 40/35* (2020.01)

(58) Field of Classification Search
CPC . G06F 16/9532; G06F 16/24578; G06F 40/35
See application file for complete search history.

(56) References Cited

U.S. PATENT DOCUMENTS

2018/0181570 A1* 6/2018 Chou ................ G06F 16/24578
2023/0252224 A1* 8/2023 Tran ........................ G06F 40/56
715/256

* cited by examiner

*Primary Examiner* — Jay A Morrison
(74) *Attorney, Agent, or Firm* — NICHOLSON DE VOS WEBSTER & ELLIOTT LLP

(57) ABSTRACT

Techniques for utilizing machine learning to generate a question and answer pair for a conversational agent are described. According to some examples, a computer-implemented method includes receiving a search indication from a user; determining a plurality of corresponding aspects for a plurality of suppliers based on a set of user reviews; generating, by one or more machine learning models, one or more contextually relevant aspects from the plurality of corresponding aspects based on the search indication for individual ones of the plurality of suppliers; generating, by the one or more machine learning models, a corresponding supplier related question for the individual ones of the plurality of suppliers based on the one or more contextually relevant aspects; selecting a supplier related question from the corresponding supplier related questions; generating, by the one or more machine learning models, a corresponding answer to the supplier related question based on one or more of the set of user reviews; and causing the supplier related question and the corresponding answer to be presented the user.

20 Claims, 13 Drawing Sheets

SEARCH INDICATION 402 (e.g., DESK)

ELIGIBLE SUPPLIERS 404

CANDIDATE (E.G., RELEVANT) SUPPLIERS 406 (e.g., SUPPLIER-X, SUPPLIER-Y and SUPPLIER-Z)

SUPPLIER SELECTION SERVICE 126-SS

SELECTED SUPPLIER 408 (e.g., SUPPLIER-X)

LOOKUP (E.G., POSITIVE) ASPECTS FOR SELECTED SUPPLIER 410 (E.G., FROM REVIEWS AND SUPPLIER INPUTS)

RELEVANT ASPECTS 412 (e.g., design, cushion)

ML MODEL (e.g., LLM) PICKS CONTEXTUALLY RELEVANT TOP ASPECT 414

PILL (e.g., Q&A) GENERATION ML MODEL 130

TOP ASPECT 416 (e.g., design)

ML MODEL (e.g., LLM) GENERATES QUESTION FOR THE SELECTED SUPPLIER AND TOP ASPECT 418

PILL (e.g., Q&A) GENERATION ML MODEL 130

QUESTION 420 (e.g., Why are SUPPLIER-X desks known for their design?)

REVIEW RETRIEVAL ML MODEL (e.g., Transformer) 128

RELEVANT REVIEWS 422 (e.g., "Customer review – desk showed craftsmanship" "Supplier input – Supplier-X regularly showcases new collections in exhibitions, and stays ahead of trends")

ML MODEL (e.g., LLM) GENERATES ANSWER USING RETRIEVED DATA 424

PILL (e.g., Q&A) GENERATION ML MODEL 140

GENERATED ANSWER 426 (e.g., SUPPLIER-X desks are known for their design because ...)

400

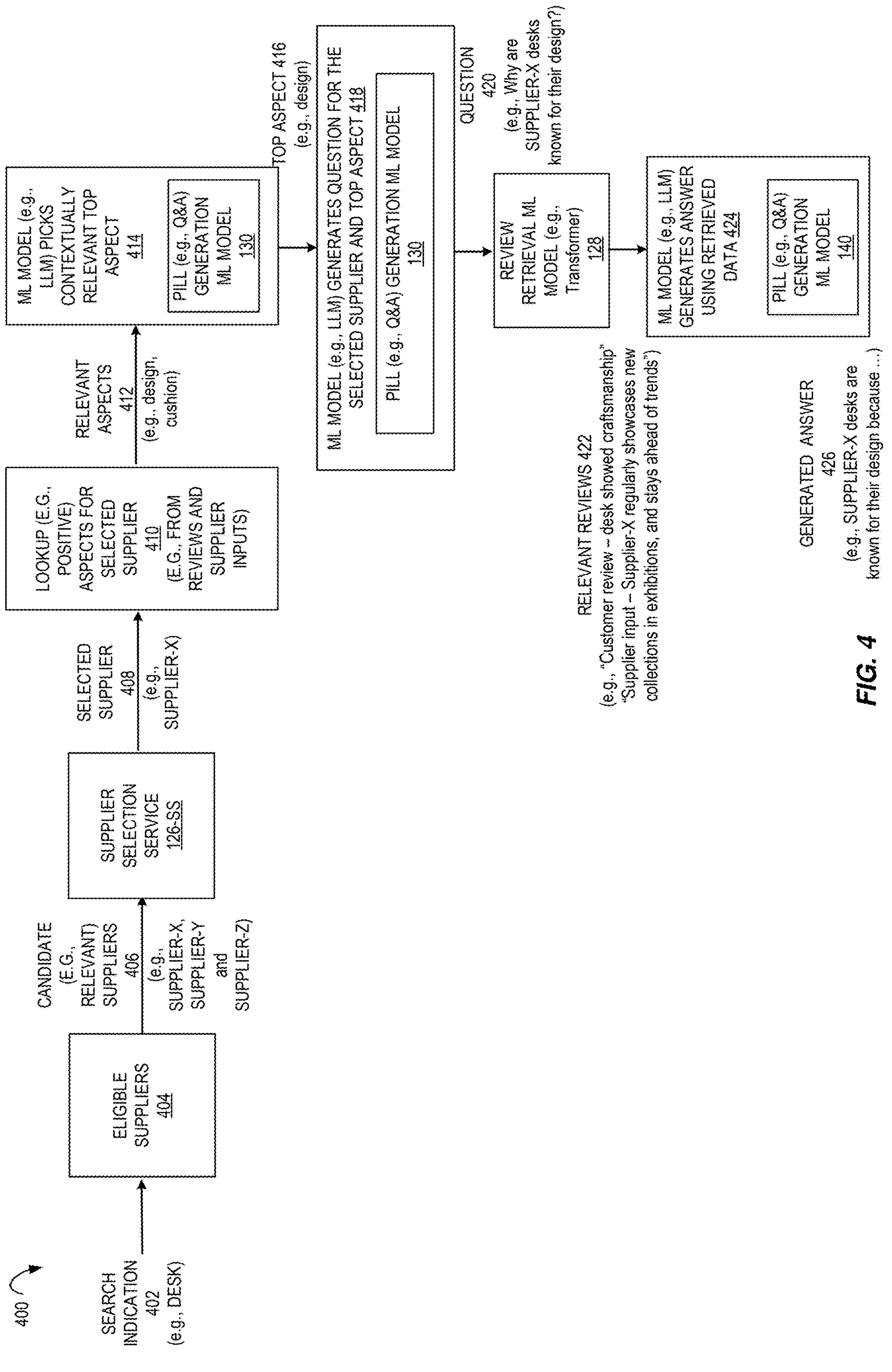

*FIG. 4*

(a) CONVERSATION STARTERS GENERATED BY CONVERSATIONAL AGENT SERVICE/SYSTEM (b) "PILL" RESPONSE FOR SELECTED SUPPLIER

800

RECEIVING AN INDICATION FROM A USER
802

DETERMINING A PLURALITY OF CORRESPONDING ASPECTS FOR A PLURALITY OF SUPPLIERS BASED ON A SET OF USER BASED CONTENT
804

GENERATING, BY ONE OR MORE MACHINE LEARNING MODELS, ONE OR MORE CONTEXTUALLY RELEVANT ASPECTS FROM THE PLURALITY OF CORRESPONDING ASPECTS BASED ON THE INDICATION FOR INDIVIDUAL ONES OF THE PLURALITY OF SUPPLIERS
806

GENERATING, BY THE ONE OR MORE MACHINE LEARNING MODELS, A CORRESPONDING SUPPLIER RELATED QUESTION FOR THE INDIVIDUAL ONES OF THE PLURALITY OF SUPPLIERS BASED ON THE ONE OR MORE CONTEXTUALLY RELEVANT ASPECTS
808

SELECTING A SUPPLIER RELATED QUESTION FROM THE CORRESPONDING SUPPLIER RELATED QUESTIONS
810

GENERATING, BY THE ONE OR MORE MACHINE LEARNING MODELS, A CORRESPONDING ANSWER TO THE SUPPLIER RELATED QUESTION BASED ON ONE OR MORE OF THE SET OF USER BASED CONTENT
812

CAUSING THE SUPPLIER RELATED QUESTION AND THE CORRESPONDING ANSWER TO BE PRESENTED THE USER
814

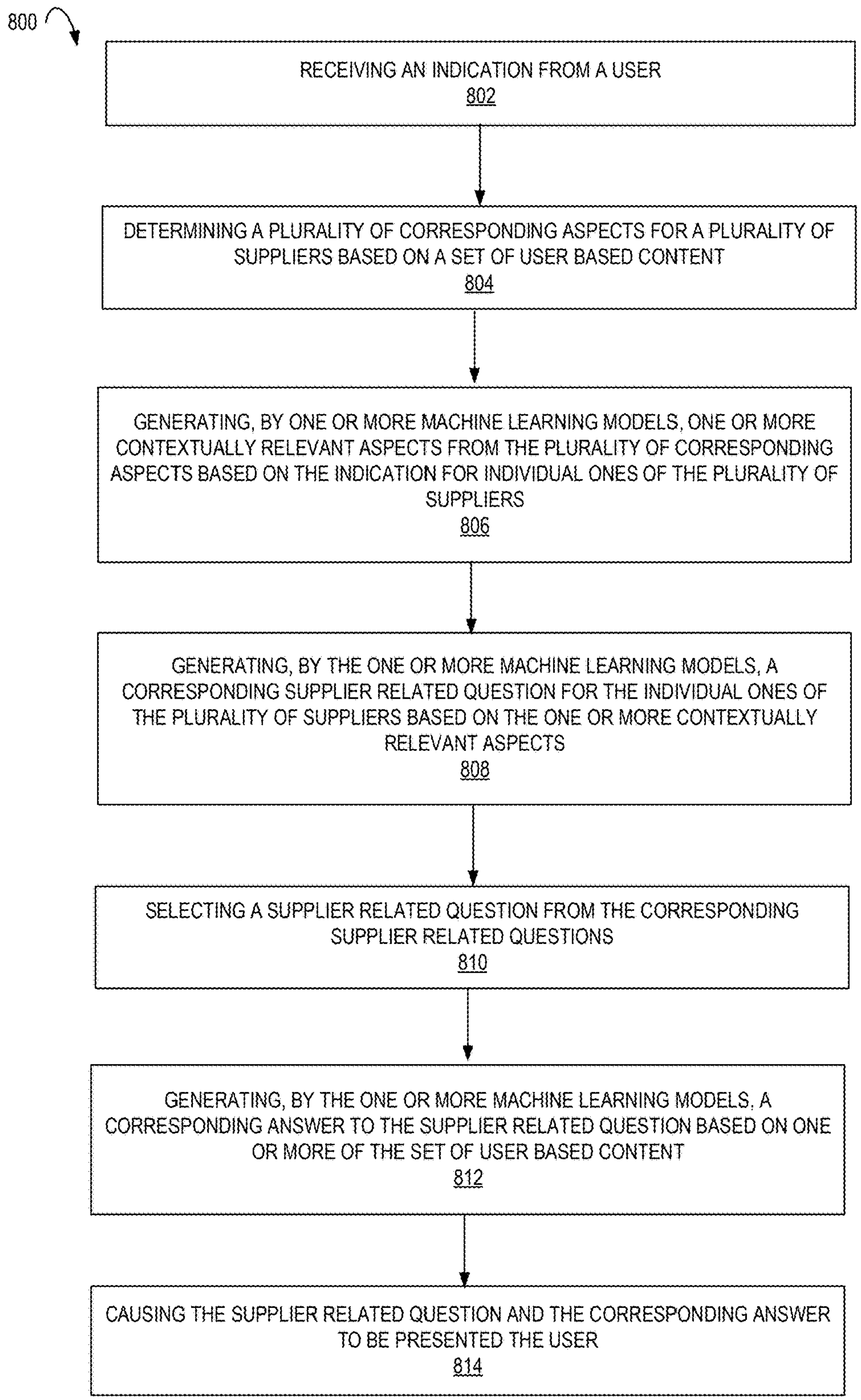

*FIG. 8*

COMPUTER-IMPLEMENTED METHODS UTILIZING MACHINE LEARNING TO GENERATE A QUESTION AND ANSWER PAIR FOR A CONVERSATIONAL AGENT

BACKGROUND

Suppliers (such as businesses, media distribution services, etc.) can employ one or more data centers to deliver content (such as web sites, web content, or other digital data) to users or clients. In certain examples, a conversational agent, e.g., a "chatbot" or "virtual assistant", engages in a natural language conversation with a computer user. Certain conversational agents are designed to provide information, answer questions, perform tasks, and/or assist with various activities in response to queries or requests received from such users. Conversational agents may be found in a wide range of applications and systems, and are capable of understanding and interpreting human languages, as well as generating responses in a human-like manner, using text or speech that is rational, easy to understand, and contextually relevant. Moreover, unlike humans, conversational agents may operate at any time of day or on any day of the year, and provide responses to users of any computer-based systems.

Certain suppliers (e.g., of products and/or services) may desire to utilize a conversational agent to connect with its user. However, certain customers (e.g., users) may not articulate the questions or expend the effort to find a supplier (e.g., the supplier's brands and/or products) that is right for them. The manual process of gathering and synthesizing information from social media, reviews, videos, and in-store visits is time-consuming and often leaves customers uncertain about the relevance and applicability of the information to their specific needs and preferences. Certain customers seek deeper insights to discover products, learn about key attributes, and find a supplier that aligns with their preferences.

BRIEF DESCRIPTION OF DRAWINGS

Various examples in accordance with the present disclosure will be described with reference to the following drawings.

FIG. 4 is a flow diagram illustrating operations of a method of utilizing machine learning at the granularity of candidate suppliers to generate a question and a corresponding answer according to some examples.

FIG. 8 is a flow diagram illustrating operations of a method of utilizing a search indication to create a question and answer pair by one or more machine learning models according to some examples.

DETAILED DESCRIPTION

Figure 1:
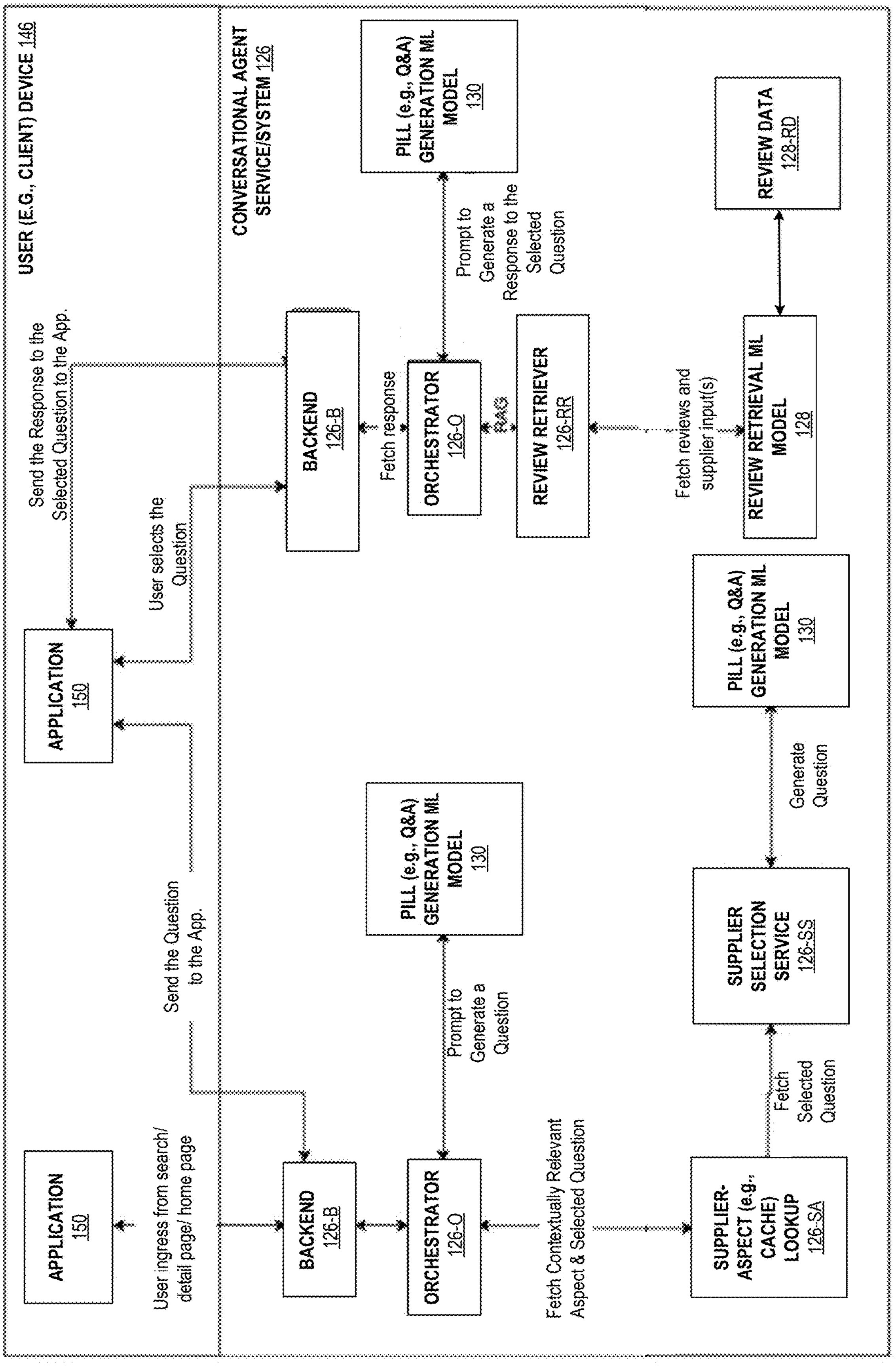
FIG. 1 is a diagram illustrating a conversational agent application of a user (e.g., client) device and a conversational agent service/system generating a question and answer pair using machine learning according to some examples.

The present disclosure relates to methods, apparatus, systems, and non-transitory computer-readable storage media for utilizing a machine learning model to generate a question and answer pair for a conversational agent. Certain examples herein are directed to a computer-implemented service that utilizes machine learning at the granularity of candidate questions to generate a question and a corresponding answer. Other examples herein utilize machine learning at the granularity of candidate suppliers (e.g., a supplier's brand(s) and/or product(s)\service(s)) to generate a question and a corresponding answer. In certain examples, a brand is the name of a product and/or service.

To overcome the technical problems discussed above, certain examples herein utilize machine learning for a conversational agent to generate a relevant question and answer pair (e.g., a branded question and answer pair) for a particular supplier (e.g., in real time), for example, where doing so during any arbitrary shopping conversation is not plausible for a human (e.g., due to the complexity of the conversation, amount of suppliers knowledge, and user review data used for the conversation).

In certain examples, a computer (e.g., computer-implemented machine learning service) generating a question and answer pair for a conversational agent based on a search indication demonstrates an improvement to computer functionality (e.g., an improvement to a computer-implemented machine learning service) because a human (even with pen-and-paper) cannot perform this in real time. Certain examples herein surface timely product details, the latest launches and innovative features, and specific product attributes. By seamlessly suggesting these questions throughout the conversation with the conversational agent, shoppers can more easily discover, explore, and compare, e.g., streamlining the previously tedious research process by a human. As a shopper converses, the machine learning model delivers more personalized (e.g., sponsored related) questions in certain examples. Supported by rich content, including product images and videos, in certain examples the ML model generated (e.g., sponsored related) questions bring expertise about a supplier directly in a conversation without involving a human, empowering shoppers to make well-informed purchase decisions and build stronger connections with trusted brands in real time.

Events that are described herein as occurring in real time or near real time can happen as instantaneously as possible, limited by certain factors such as the time required for transferring data (e.g., requests and responses) between computing devices, and the ability of computer hardware and software to process information. Real time (or near real time) can also mean immediately, as it happens, e.g., in the context of a system that processes data, these terms may mean processing data as it is received as opposed to storing or persisting the data once received for processing later on.

Certain examples herein are directed to a novel selection of a question and answer pair (e.g., presented in a pill or another interactive element provided in a user interface) using user based content (e.g., user reviews (e.g., multiple users' reviews) and/or user activity data, e.g., product return data, time a product has been in each user's electronic "cart", etc.) and/or a specialized retrieval system which allows suppliers to influence a machine learning model's (e.g., a large language model (LLM)) response and/or the gathering of (e.g., fresh) information relevant to the context (e.g., latest reviews about a supplier's aspects). The problem of supplier selection and/or question selection for a pill is non-trivial since it needs to meet the shopper's expectations (e.g., relevance to the context and low latency serving for a smooth experience), the supplier's (e.g., advertiser's) expectations (e.g., highlight its best aspects and/or generate a supplier friendly/safe response), and/or a programmatic content allocation system's (e.g., monetization) objective. Certain examples herein cater to each of these objectives in a balanced manner, e.g., and have mitigations for engagement data sparsity in conversational contexts. In certain examples, retrieving supplier-aspect related data from reviews and supplier inputs in real-time is not straightforward. Certain examples herein utilize a machine learning model (e.g., a review retrieval ML model) to retrieve user review data.

Certain examples herein generate questions in a machine learning (e.g., LLM) based conversational agent (e.g., "assistant") (i) for product features and/or aspects for a supplier and/or (ii) based on supplier inputs and/or shopper reviews.

Certain examples herein generate a relevant question and answer for a supplier in a machine learning (e.g., LLM) based conversational agent that: (i) help in supplier discovery and short cut shopping journeys (e.g., benefitting both the shopper and supplier), (ii) generates aspect based question and answer pairs (and their responses) based on review data (e.g., allows for the utilization of customer reviews and also helps suppliers with good reviews to directly benefit from them in their sales campaigns), (iii) allows a supplier to cause a selection of a particular conversational experience(s) between a user and the conversational agent to provide an indication of a supplier (e.g., of their product and/or brand) with low complexity/hardware cost, low latency, and that is robust to engagement data sparsity issues, (iv) uses a (e.g., Transformer) review retrieval ML model that is fine-tuned to have high retrieval performance and response generation quality, and/or (v) uses a retrieval augmented generation (RAG) based response generation using supplier inputs as a mechanism to help supplier safety (e.g., where ML generated content which can be harmful/negative for the supplier's image is controlled via the supplier's inputs in retrieval augmented generation).

In certain examples, the relevant question for a supplier is a follow-up question (e.g., that appears alongside non-sponsored questions/responses) directed by a supplier rather than generated organically by a conversational agent or human. In certain examples, these supplier related questions make it easy for shoppers to discover branded content and offerings, and in turn drive discoverability and engagement for suppliers while supplementing or improving supplier (e.g., brand) specific related questions that a conversational agent generates, e.g., by adding additional context or information from suppliers.

In certain examples, a machine learning model (e.g., large language model (LLM)) based conversational agent (e.g., shopping assistant) is trained on a retailer's data (e.g., catalog and customer reviews). From a search results page, shoppers can ingress into a conversation layer of the LLM to initiate a conversation. For such ingresses, certain examples of an LLM generate a set of (e.g., conversation starter) question and answer pairs (e.g., as pills) which guide the shopper on topics relevant to their search query (e.g., for "desk" search query, "what desk features are important for ergonomics?" is a starter question (e.g., in a pill)). At this point in the shopper's journey, such a question and answer pair (e.g., in a pill) is an opportunity for suppliers (e.g., brands) to drive discovery, educate shoppers on relevant product features (e.g., aspects) the supplier is known for, and eventually help the shopper towards a purchase. As an example, for a "desk" search query and a supplier "X" that is known for its "designs" aspect, a question (e.g., in pill) for supplier X (e.g., a question presentation opportunity that is sponsored by supplier X) is "Why are supplier X desks known for their designs". To enable this opportunity for suppliers, certain examples herein introduce a content presentation (e.g., pill presentation) marketplace to rank suppliers in real-time (e.g., via an auction) for a sponsored content presentation (e.g., pill) opportunity. Considering complexity and accuracy tradeoffs, two different approaches for this are: (1) selecting a supplier (e.g., a supplier auction) at the granularity of candidate suppliers, and (2) selecting a question (e.g., a branded question auction) at the granularity of candidate questions for presentation in a pill. In certain examples, common to both approaches (1) and (2) is the generation method for a sponsored pill (e.g., the question and its answer to include in the pill). Certain examples herein generate an aspect based sponsored pill (e.g., the question and its answer to include in the pill) for a supplier (e.g., "Why are supplier X desks known for their designs?" for (i) supplier X and (ii) a "design" type of aspect) using the ML model (e.g., LLM) with retrieval augmented generation (RAG). In certain examples, in a retrieval augmented generation approach, supplier specific aspect data is retrieved from (e.g., online) user reviews and supplier's inputs (e.g., a supplier's preferred list of aspects for highlighting to shoppers and/or supplier safety guidelines for generating responses), and this is fed as input to the ML model (e.g., LLM) for pill (e.g., the question and its answer to include in the pill) generation. In certain examples, the retrieval augmented generation approach (1) ensures the pill's (e.g., the question and its answer to include in the pill) consistency with the latest data (e.g., a typical blind spot in an LLM's infrequent training), (2) enables the selected (e.g., "winning") supplier's inputs to influence the ML model's (e.g., LLM's) pill (e.g., the question and its answer to include in the pill) generation, and (3) provides relevant input data (e.g., evidence) to the ML model (e.g., LLM) within a limited context window.

In certain examples, a retrieval augmented generation approach allows for the real-time retrieval of a supplier's data specific to an aspect (e.g., retrieving customer reviews for a winning supplier's aspect) as a technical challenge. In certain examples herein, a Transformer model (e.g., not an LLM) is used as an information retrieval model, e.g., conversational advertisement information retriever (CAIR). In certain examples, the Transformer is a Text-to-Text Transfer Transformer (T5) ML model that is trained for the retrieval task. In certain examples, the information retrieval model (e.g., CAIR) is fine-tuned using a triplet loss on the task of retrieving customer review snippets related to a supplier's aspects. In certain examples, this fine-tuning approach significantly improves the model's retrieval metrics, which leads to more informative sponsored pill responses. Certain examples herein thus allow for the: (1) introduction of a new (e.g., ads) marketplace for sponsored pills in search based conversational shopping assistants, (2) an auction design for sponsored pills, and (3) a fine-tuned retrieval system (e.g., CAIR) for retrieval augmented generation (RAG) based pill generation using user review data and supplier inputs. Although aspect based pills for suppliers and the usage of user review data with supplier inputs are novelties (e.g., in contrast to organic follow-up questions in an LLM assistant), in certain examples the designs and ML models herein (e.g., CAIR) can be generalized to other contexts (e.g., conversation continuation pills once a shopper starts engaging with the conversational agent and/or pills for ingresses from detail pages and home page). In certain examples, extensions of the proposed approaches can be used for different question types (e.g., questions suggested by the LLM), multimodal responses (e.g., responses with video and audio inputs from suppliers), and/or personalization of sponsored pills based on shopping/user history.

Figure 6:
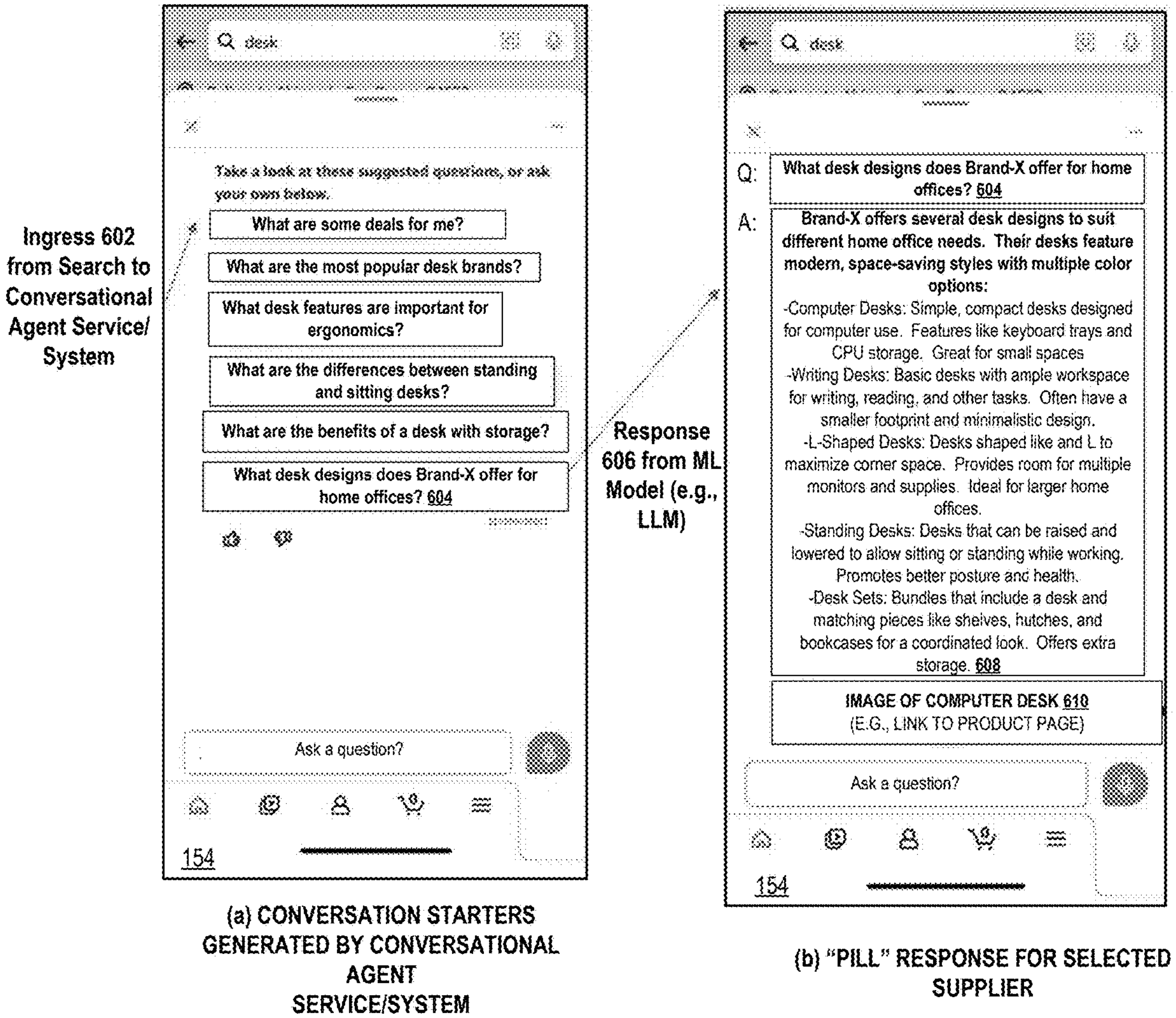
FIG. 6 is a diagram illustrating a graphical user interface (GUI) presenting a question generated by a machine learning model and presenting the response to that question according to some examples.

In certain examples, large language models (LLMs) are used to implement conversational shopping assistants, e.g., where shoppers can ingress into the conversation layer from both search and detail pages (DP) of products. In certain examples, once in the conversation layer, a user can ask a question to the conversational agent (e.g., guidance seeking questions around their search query, factoid questions about a product, etc.) or they can engage with conversation starter pills (e.g., questions in the pills) generated by the conversational agent based on the ingress context (e.g., the search query or the detail page depending on the type of ingress). In certain examples, a conversational agent pill opportunity for suppliers can be explained at a high level as follows. Consider a shopper who ingresses into a conversational agent from the search page (e.g., after typing in their search query), and is exposed to a set of starter pills (also referred to as related questions). In certain examples, all starter pills generated by the conversational agent are organic in nature, e.g., and the ML model (e.g., LLM) is not instructed to guide them towards any supplier in particular. However, a supplier may want to have a certain user guided towards them (e.g., guided towards the supplier's product or brand), and certain examples herein use a (e.g., sponsored) pill which highlights the supplier along with key features (e.g., aspects) associated with the supplier. As discussed below, FIG. 6 shows an example of such a sponsored pill which is inserted after the last organic pill. In certain examples, the position of the sponsored pill can be fixed (e.g., there is only one sponsored pill and it always appears at end after the last organic pill) or it can be dynamic (e.g., ranked based on the utility of the sponsored pill versus other organic pills).

Implementing such supplier sponsored pills (e.g., a question and answer pair in that pill), may cause following technical challenges: (1) real-time supplier selection for a sponsored pills opportunity, and (2) influencing the ML model (e.g., LLM) to generate the sponsored pill (e.g., question and response) for a supplier while being consistent with current user review data (e.g., latest reviews) and the supplier's inputs/expectations. In certain examples, the supplier is charged when a shopper clicks on a sponsored pill (e.g., pay-per-click), and thus the pill is to be consistent with the supplier's expectations (e.g., highlight positive aspects of the supplier to guide shoppers towards a purchase, and generate responses in line with supplier safety guidelines). Another technical challenge which depends on the choice of an ML model (e.g., LLM) is (3) an LLM may have a limited context window (e.g., 4K tokens for the LLM)) which limits the amount of information that can be injected into certain examples of retrieval augmented generation.

To address technical challenge (1), certain examples herein provide an auction to rank suppliers for a sponsored pills opportunity. For example, where suppliers submit their cost-per-click (CPC) bid, and are ranked based on expected payoffs to the system and expected shopper engagement with the pill. As noted above, there may be two designs for the auction: supplier auction and branded question auction. In certain examples of a supplier auction, the auction is conducted across suppliers before the pill's question is generated. In certain examples, the engagement estimates used in the supplier's auction score are at the granularity of a supplier (as opposed to a pill or question granularity), and the pill question is to be generated only for the winning supplier. In certain examples of a branded question auction, candidate questions for all eligible suppliers are generated first, and the auction is conducted across all candidate questions. To address technical challenges (2) and (3), certain examples herein are directed to an ML model (e.g., conversational ad information retriever (CAIR)) which retrieves contextually relevant information for the winning supplier from sources including user reviews, supplier pages, and/or supplier inputs specifically for sponsored pills (e.g., whenever available), e.g., a supplier may specify the aspects they want to be highlighted for and/or provide supplier safety guidelines for pill responses. In certain examples, the retrieval results from CAIR are used within the question and answer generation ML model's (e.g., LLM's) limited context window to generate the sponsored pill in a retrieval augmented generation manner. As an example to understand how the proposed approaches for auction and pill generation come together, consider a shopper who ingresses into a conversational agent with search query "desk". In certain examples of the supplier auction approach, suppliers X, Y, and Z participate in the pills auction because they have enabled targeting for a "desk" search query. In certain examples, supplier X emerges as the auction winner, and the top aspect for supplier X is "design" (e.g., contextually chosen by the LLM from a list of aspects specified by supplier X and inferred from the user reviews). Based on this, in certain examples, the ML model (e.g., LLM) generates a sponsored pill with the question "Why are supplier X desks known for their designs?", and CAIR is then used to retrieve reviews as well as supplier X's inputs related to "design" in real time, which are then fed to the ML model (e.g., LLM) to generate the response for the pill "Supplier X desks are known for their designs because . . . ". This example is explained with an end-to-end architecture diagram for supplier auction in FIG. 4.

Thus certain examples herein include: (1) introduction of a new ads marketplace for sponsored pills giving suppliers (e.g., and advertisers) a chance to influence conversational shopping journeys, (2) auction design for sponsored pills, and (3) the CAIR retrieval system for retrieval augmented generation (RAG) based sponsored pill generation. In certain examples, the CAIR model is fine-tuned on user reviews leading to superior retrieval performance and quality of sponsored pill response. In addition to the proposed "aspect based" pills being novel in their usage of supplier inputs and reviews data for monetization, the approaches herein can be generalized to any branded question generated by the ML model (e.g., LLM). In certain examples, the approach is also not limited to starter pills and can be extended to conversation continuation pills (e.g., shown to shoppers after they start engaging with the conversational agent), and also to pills generated for other browsing contexts like detail page and homepage. In certain examples, a sponsored pill can be personalized based on a shopper's history.

Turning now to the figures, FIG. 1 is a diagram illustrating a conversational agent application 150 of a user (e.g., client) device 146 and a conversational agent service/system 126 generating a question and answer pair using machine learning according to some examples.

In certain examples, a user ingresses into the conversational agent application 150 from a search, a detail page, a home page, or other point. In certain examples, the conversational agent application 150 sends a request to the backend 126-B of conversational agent service/system 126 to generate a question (e.g., a pill to be presented to the user by the conversational agent application 150), e.g., and the orchestrator 126-0 is to perform the steps to generate the pill (e.g., question and answer in the pill). In certain examples, the orchestrator 126-0 performs a supplier-aspect lookup 126-SA, e.g., within a cache therein, to determine a contextually relevant aspect for the user (e.g., for their search or other indication at their ingress into application 150). In certain examples, this supplier-aspect lookup 126-SA determines (e.g., positive) aspects for the candidate suppliers. In certain examples, the supplier selection service 126-SS (e.g., auction service) selects a supplier from a plurality of supplier. In certain examples, the pill (e.g., question and answer (Q&A)) generation ML model 130 generates a corresponding question for the selected supplier, e.g., based on that supplier's contextually relevant aspect(s). In certain examples, the question is then sent (e.g., as a pill) to application 150.

In certain examples, the user selects (or otherwise indicates a desire to see the answer) and the application 150 then sends the request for the answer to the presented question. In certain examples, the orchestrator 126-0 requests a retrieval augmented generation (RAG), e.g., which causes the review retriever 126-RR to cause the review retrieval ML model 128 (e.g., CAIR) to fetch the relevant reviews from review data 128-RD. In certain examples, the relevant reviews (e.g., along with a supplier input (e.g., supplier guidelines)) is provided to the pill (e.g., question and answer (Q&A)) generation ML model 130 which then generates a corresponding answer for the question presented to the user for the selected supplier, e.g., based on that supplier's review(s) that are relevant (e.g., within a similarity threshold) to the user search.

Figure 2:
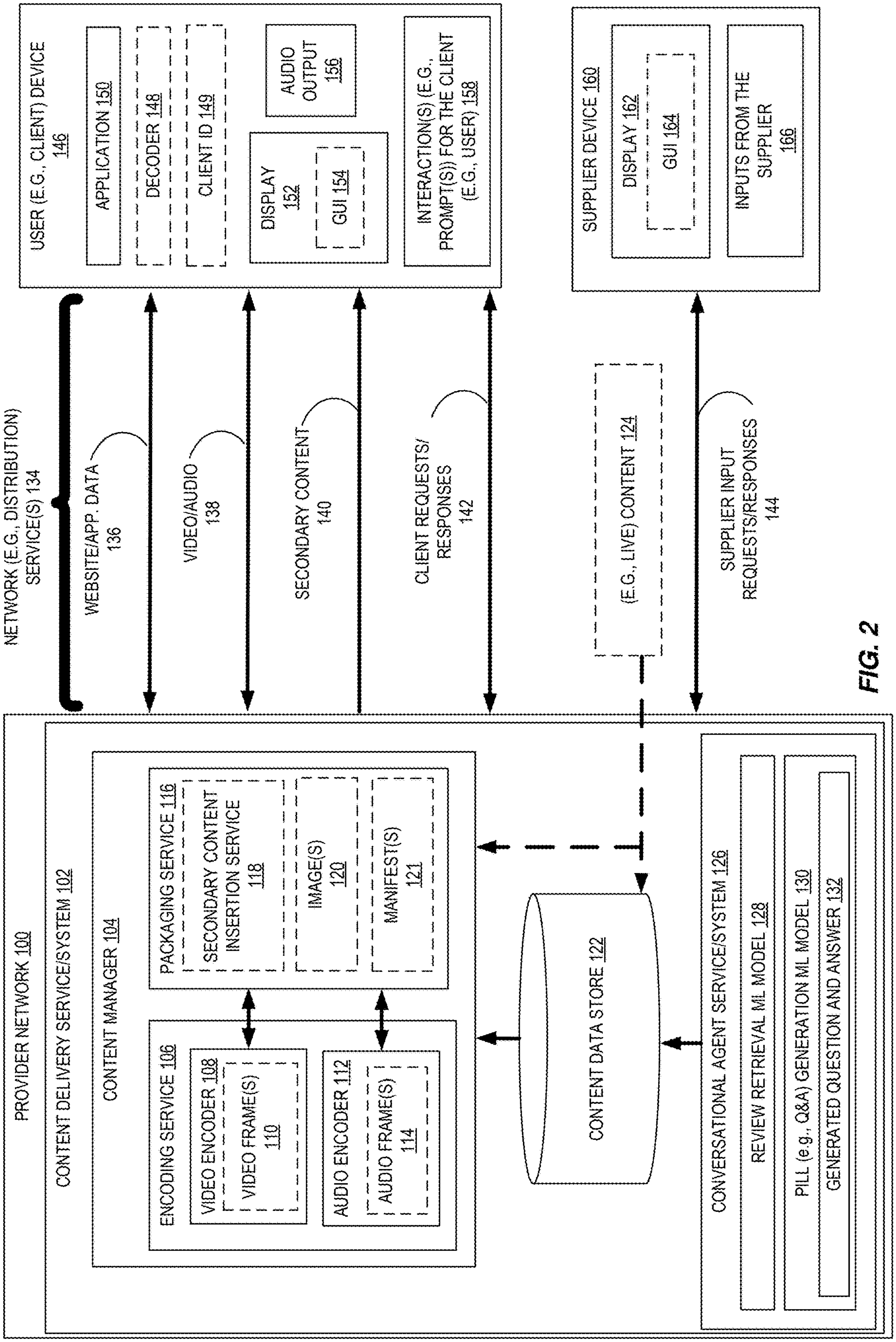
FIG. 2 is a diagram illustrating an environment including a provider network (including a conversational agent service/system) communicatively coupled to a user (e.g., client) device (including a conversational agent application) according to some examples.

FIG. 2 is a diagram illustrating an environment including a provider network 100 (including a conversational agent service/system 126) communicatively coupled to a user (e.g., client) device 146 (including a conversational agent application 150) according to some examples.

In certain examples, the provider network 100 (e.g., cloud provider) is communicatively coupled to the client device 146 (e.g., media player device) via network (e.g., distribution) service(s) 134. In certain examples, client (e.g., user) device 146 plays and/or displays content from content delivery service/system 102, for example, displays website and/or application (e.g., e-commerce or shopping application) data 136, video and/or audio 138, and/or secondary content 140 (e.g., images 120, video, etc.), e.g., sent via network (e.g., distribution) services 134. In certain examples, client device 146 is a media player device, e.g., including a decoder 148 to decode video for viewing on display 152 and/or audio for outputting on audio output (e.g., speaker) 156. In certain examples, the display 152 displays a graphical user interface (GUI) 154, for example, to input one or more client interactions 158 (e.g., prompts), e.g., a search request.

In certain examples, the provider network 100 (e.g., conversational agent service/system 126) is communicatively coupled to client device 146 to send and/or receive client requests and/or responses 142. In certain examples, client (e.g., media player) device 146 includes a client (e.g., and/or media player) identification (ID) 149, e.g., to uniquely identify the media player and/or client (e.g., user).

In certain examples, a content provider 124 is to send content to a content data store 122 (e.g., which may be implemented in one or more data centers). In certain examples, a content provider 124 is on site to capture video (e.g., and audio) of a live event. In certain examples, content provider 124 is to encode the resulting output and send that encoded content to one or more downstream entities (e.g., content delivery service/system 102), e.g., via one or more networks.

As one example, a media file (e.g., including a video file and audio file) (e.g., a media container) that is to be encoded is accessed from the content data store 122 by a content manager 104. In certain examples, the media file may be uploaded to content data store 122 by content provider(s) or provided directly (e.g., as live content) to the content manager 104 by content provider(s) (e.g., from a live content encoder).

In certain examples, the content manager 104 controls the encoding (e.g., transcoding) of a media file into packages and files in various formats and in different sizes for distribution to end users (e.g., viewers). In certain examples, a user (e.g., separate from an end user or client) creates a job for a (e.g., uncompressed) multimedia file by specifying (e.g., via a console of or an application programming interface (API) call to the content manager) the information that the service will use to perform the encoding (e.g., transcoding). This information may include which multimedia file(s) to encode (e.g., transcode), which types of files to create and where to store them, which encoding settings to use, which advanced features to apply, etc. In certain examples, to set up a job, a user specifies the input files (e.g., from content data store 122) for the service to encode (e.g., transcode from one format to a different format), for example, by specifying the source for each video, audio, and/or captions media element. That source might be a specific part of a primary input file, or it might be a separate file. In certain examples, to set up a job, a user specifies the types of output files (e.g., and packages) that are to be generated from the input. In certain examples, to set up a job, a user specifies the encoding settings to produce the quality and type of output that is desired.

In certain examples, the encoding service 106 is to encode the media file (e.g., video file and corresponding audio file) into one or more sets of video and audio representations (e.g., streams). In FIG. 1, video encoder 108 is to receive an input of a video file and create video frame(s) 110 from that video file, e.g., for a video frame and/or fragment duration. In FIG. 1, audio encoder 112 is to receive an input of an audio file and create audio frame(s) 114 (e.g., a number of audio samples within each frame) for that audio file, e.g., at an audio frame and/or fragment duration. In certain examples, packaging service 116 is then to create one or more sets of multimedia (e.g., video and audio) representations (e.g., a media presentation), for example, a representation according to a standard (e.g., a MPEG-DASH standard, a HyperText Transfer Protocol (HTTP) Live Streaming (HLS) standard, a Smooth Streaming standard, or other standard). Encoding service 106 may include a plurality of instances of video encoder 108 and audio encoder 112, e.g., to process multiple inputs in parallel. In certain examples, secondary content insertion service 118 adds secondary content (e.g., advertisement(s)) into a main content. In certain examples, encoding service 106 is to encode both the main content and secondary content, e.g., and the secondary content insertion service 118 is to insert secondary content into the main content. In certain examples, the secondary content is generated by conversational agent service/system 126, e.g., multimodal content as discussed below.

In certain embodiments, packaging service 116 includes one or more manifests 121, e.g., identifying the media file(s) (e.g., fragments, streams, etc.). In certain embodiments, a manifest for a particular media file (e.g., a particular title) identifies a proper subset of video and audio representations of the media file for a particular client device 146 (e.g., based on the client's media player (e.g., determined from its client ID value 149), display 152 resolution, audio output 156 capabilities, and/or available bandwidth). In certain embodiments, the content is stored in the content delivery service/system 102 in two parts: (i) the manifest 121 of all available media representations (e.g., their URL addresses and, optionally, other characteristics) and (ii) the media files (e.g., representations) (e.g., stream of fragments) in a single (e.g., container) or multiple files (e.g., in content data store 122). In certain embodiments, a client device 146 is to read a manifest 121 (e.g., sent in response to a manifest request) before the client device may make a request for the media from that manifest, and thus access media files (e.g., audio fragments and corresponding video fragments) from content data store 122.

In certain embodiments, secondary content insertion service 116 adds secondary content (e.g., advertisement(s)) into a main content. In certain embodiments, encoding service 106 is to encode both the main content and secondary content, e.g., and the secondary content insertion service 116 is to insert the secondary content into the main content.

In certain examples, a supplier (for example, a product supply company and/or service supply company, e.g., brand) device 160 includes a display 162 that displays a graphical user interface (GUI) 164, e.g., to input one or more supplier inputs 166 (e.g., brand's preferred list of aspects for highlighting to shoppers and/or brand safety guidelines for generating responses). In certain examples, the provider network 100 (e.g., conversational agent service/system 126) is communicatively coupled to supplier device 160 to send and/or receive supplier requests and/or responses 144.

In certain examples, a conversational agent service/system 126 is to perform one or more of the operations herein, e.g., to generate a pill for the conversational agent application 150. In certain examples, the conversational agent service/system 126 includes a review retrieval ML model 128 (e.g., CAIR) and/or pill (e.g., question and answer (Q&A)) generation ML model 130 to generate one or more pairs of questions and their answers 132 (e.g., for use in a pill).

In certain examples, the pill can include multimedia, e.g., video and/or audio inserted by packaging service 116.

Two Example Architectures

The following discusses end-to-end architectures for (e.g., sponsored) pill generation, and particularly (1) an architecture utilizing machine learning at the granularity of candidate questions (e.g., branded question auction), and (2) an architecture utilizing machine learning at the granularity of candidate suppliers (e.g., supplier auction). Although these two architectures refer to conversation starter pills and aspect based pills for a supplier, further below is a discussion how these can be extended to conversation continuation pills and/or to any branded questions generated by the ML model (e.g., LLM).

(1) Architecture Utilizing Machine Learning at the Granularity of Candidate Questions (E.G., Branded Question Auction)

Figure 3:
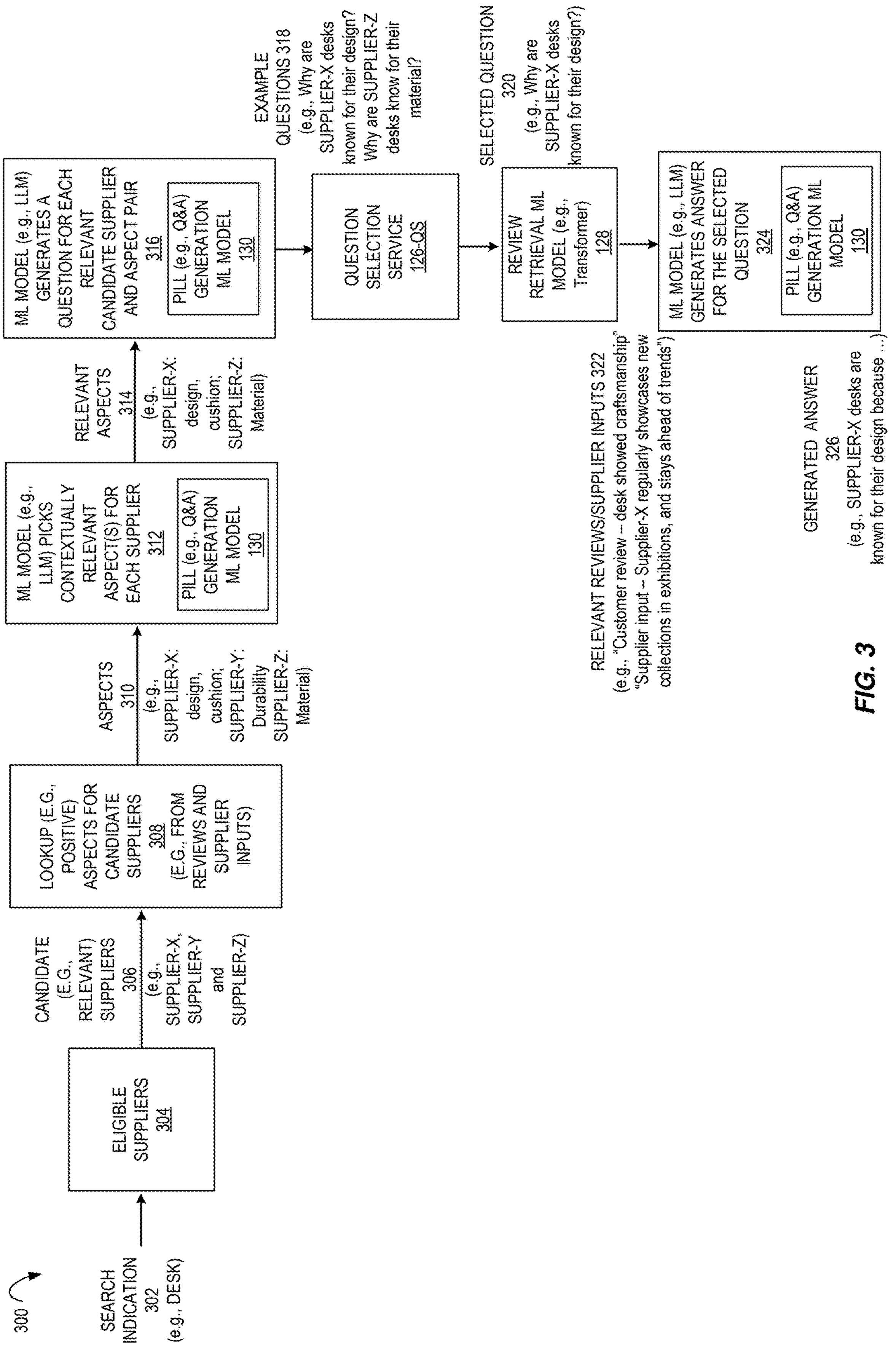
FIG. 3 is a flow diagram illustrating operations of a method of utilizing machine learning at the granularity of candidate questions to generate a question and a corresponding answer according to some examples.

One difference in the architecture of (1) an architecture utilizing machine learning at the granularity of candidate questions (e.g., branded question auction), and (2) an architecture utilizing machine learning at the granularity of candidate suppliers (e.g., supplier auction) is the relative ordering between question generation and auction steps. As shown in FIG. 3, in certain examples, for each supplier eligible for selection (e.g., eligible for the auction), one or more top aspects are inferred and filtered by the ML model 130 (e.g., LLM) to retain the ones relevant to the shopper's search context. In certain examples, a pool of candidate branded questions for the auction is generated (e.g., on the fly) for the retained supplier-aspect pairs (e.g., either via a template like "Why is [supplier] known for [top aspect]?" or via the LLM by asking it to generate questions around the supplier and the chosen aspect). In certain examples, this step of creating a pool of questions can be parallelized via replicas of the LLM (e.g., each processing a subset of suppliers) to cut down on latency. In certain examples, the next step is to select a question from the candidate questions, e.g., via an auction across all candidate questions. In certain examples, a supplier can have multiple question candidates in the auction, e.g., as opposed to having a single candidate in the supplier auction approach (2) below. In certain examples, for the selected (e.g., winning) question, relevant reviews information and supplier inputs (e.g., supplier's preferred list of aspects for highlighting to shoppers and brand safety guidelines for generating responses) are obtained (e.g., via ML model 128, e.g., CAIR), and the its results are used in a retrieval augmented generation manner to generate the response.

In certain examples, utilizing machine learning at the granularity of candidate questions (e.g., branded question auction) allows (i) suppliers to refine their bids for each aspect associated with their brand/product as opposed to having a single bid for the supplier's pill, (ii) estimates used for expected purchases (e.g., payoffs) are closer to actual values since the auction takes into account the final question shown to the shopper, and (iii) for a higher auction depth due to multiple question candidates from the same supplier, e.g., which is beneficial for monetization.

FIG. 3 is a flow diagram illustrating operations 300 of a method of utilizing machine learning at the granularity of candidate questions to generate a question and a corresponding answer according to some examples. In FIG. 3, the operations 300 include, at block 302, receiving a search indication (e.g., from a user via a conversational agent application) (e.g., a "desk"). The operations 300 further include, at block 304, determining a set of eligible suppliers (e.g., candidate suppliers 306 that sell a product or service that is relevant to the search indication). This is shown in FIG. 3 as suppliers X, Y, and Z. The operations 300 further include, at block 308, looking up the (e.g., positive) aspects for each of those candidate suppliers, e.g., from user reviews and/or supplier inputs (e.g., supplier guidelines), to determine one or more aspects 310 for each supplier. The operations 300 further include, at block 312, the ML model 130 (e.g., LLM) picking a (e.g., most) contextually relevant aspect 314 from the one or more aspects 310 for each supplier, e.g., based on the search indication 302. The operations 300 further include, at block 316, the ML model 130 (e.g., LLM) generates a question 318 for each relevant candidate supplier and aspect pairing, e.g., based on their relevant aspects 314. The operations 300 further include, at block 126-QS, selecting a question 320 from the plurality of questions 318, e.g., based on an auction for the suppliers for the opportunity to present that question to the user. The operations 300 further include the ML model 128 (e.g., CAIR) determining a set 322 of relevant reviews for that supplier (e.g., a particular product and/or brand) and/or relevant input(s) from the supplier. The operations 300 further include, at block 324, the ML model 130 (e.g., LLM) generates an answer 326 for the selected question 320, e.g., based on the set 322 of relevant reviews for that supplier (e.g., a particular product and/or brand) and/or relevant input(s) from the supplier. In certain examples, the question 320 and its answer 326 are presented to the user, e.g., via GUI 154.

In certain examples, the LLM generate questions at 316 for all candidate supplier-aspect pairs. In certain examples, a single LLM does this generation for all such candidate pairs. In other examples, the question generation is distributed across multiple LLMs 130, e.g., to reduce the latency. In other words, if "N" number of LLMs and K supplier-aspect pairs, each LLM can generate questions for K/N supplier-aspect pairs and contribute to the pool of questions (e.g., for an auction).

In certain examples, the question selection service 126-QS generates an auction score to select a question from a plurality of questions. In certain examples, the auction score for each question is:

$$\text{auction score}=\text{bid\_question}\times\text{Pctr\_question}+\text{alpha}\times\text{Pirrel\_question}+\text{beta}\times\text{Pctr\_question},$$

where Pctr_question is the predicted click-through-rate (CTR) for the search query, sponsored pill (e.g., sponsored pill's question), and/or shopper (e.g., shopping history) tuple, Pirrel is a measure of irrelevance between the search query and the supplier's sponsored pill, and (alpha, beta) are scaling coefficients. In certain examples (e.g., as compared to the auction score discussed below for the supplier auction) the branded question auction has a granularity of the exact question in the pill. In certain examples, a supplier has the flexibility to have different bids for each of its questions (e.g., when there is enough engagement data to predict the Pctr at this granularity).

In certain examples, a service/system caches the CTR and/or relevance estimates at a shopper query and "branded" question level to save repetitive computation costs for frequently occurring shopper queries.

(2) Architecture Utilizing Machine Learning at the Granularity of Candidate Suppliers (E.G., Brand/SupplierAuction)

As shown in FIG. 4, in certain examples, the first step for generating an aspect based sponsored pill via the supplier auction approach is to select (e.g., via an auction) a supplier from a plurality of eligible suppliers, for example, based on the shopper's search query (e.g., passed as context to the LLM/conversational agent when the shopper ingresses from a search). In certain examples, for the selected (e.g., winning) supplier, the top positive aspects (e.g., determined (e.g., pre-computed) for a supplier based on reviews and supplier inputs/preferences) are obtained via a look-up, and the ML model (e.g., LLM) is instructed to pick an aspect relevant to the search context and generate a pill question around it (e.g., "Why is [supplier] known for [top aspect]?" as shown for the winning supplier X and top aspect "design" in FIG. 4). In certain examples, for the pill response, the review retrieval ML model 128 (e.g., CAIR) is invoked to retrieve reviews and supplier inputs related to the top (e.g., contextually relevant) aspect in the pill question. In certain examples, the review retrieval ML model 128 (e.g., CAIR) results are used in a retrieval augmented generation manner by the ML model 130 (e.g., LLM) to generate the final response.

FIG. 4 is a flow diagram illustrating operations 400 of a method of utilizing machine learning at the granularity of candidate suppliers to generate a question and a corresponding answer according to some examples. In FIG. 4, the operations 400 include, at block 402, receiving a search indication (e.g., from a user via a conversational agent application) (e.g., a "desk"). The operations 400 further include, at block 404, determining a set of eligible suppliers (e.g., candidate suppliers 406 that sell a product or service that is relevant to the search indication). This is shown in FIG. 4 as suppliers X, Y, and Z. The operations 400 further include, at block 126-SS, selecting a supplier 408 from the candidate suppliers 406, e.g., based on an auction for the suppliers for the opportunity to present their product and/or brand to the user. This is shown as selected supplier 408 (supplier X) in FIG. 4. The operations 400 further include, at block 410, looking up the (e.g., positive) aspects that selected supplier 408, e.g., from user reviews and/or supplier inputs (e.g., supplier guidelines), to determine one or more aspects 412 for the selected supplier 408. The operations 400 further include, at block 414, the ML model 130 (e.g., LLM) picking a (e.g., most) contextually relevant aspect 416 from the one or more aspects 412 for the selected supplier 408, e.g., based on the search indication 402. The operations 400 further include, at block 418, the ML model 130 (e.g., LLM) generates a question 418 for the selected supplier 408, e.g., based on the aspect 416. The operations 400 further include the ML model 128 (e.g., CAIR) determining a set 422 of relevant reviews for that supplier (e.g., a particular product and/or brand) and/or relevant input(s) from the supplier. The operations 400 further include, at block 424, the ML model 130 (e.g., LLM) generates an answer 426 for the selected question 420, e.g., based on the set 422 of relevant reviews for that supplier (e.g., a particular product and/or brand) and/or relevant input(s) from the supplier. In certain examples, the question 420 and its answer 426 are presented to the user, e.g., via GUI 154.

In certain examples, the supplier selection service 126-SS generates an auction score to select a supplier from a plurality of suppliers. In certain examples, the auction score for each candidate supplier is:

$$\text{auction score}=\text{bid}\times\text{Pctr\_pill}+\text{alpha}\times\text{Pirrel\_pill}+\text{beta}\times\text{Pctr\_pill},$$

where Pctr_pill is the predicted click-through-rate (CTR) for the search query, sponsored pill (e.g., sponsored pill's question), and shopper (e.g., shopping history) tuple, Pirrel is a measure of irrelevance between the search query and the supplier's sponsored pill, and (alpha, beta) are scaling coefficients. In certain examples, the bid is the cost-per-click (CPC) bid the supplier is willing to pay for a pill click. In certain examples, computing Pctr_pill has confounding factors here, e.g., the exact pill question is dynamically decided by the LLM after a supplier is selected (e.g., from auction), and the pill engagement is dependent on the question. To handle those, certain examples herein consider the average engagement of the supplier's pills across all its impressed questions for the search query as Pctr_pill and/or use the same averaging logic for Pirrel_pill. In certain examples, when exploring pills for a supplier, there is not enough logged data to compute the above engagement estimates. Certain examples approximate the auction score for a supplier using inline search estimates as follows:

$$\text{initial auction score}=\text{max\_PIN}\{\text{bid}\times\text{Pctr\_inlinePIN}+\text{alpha}\times\text{Pirrel\_inlinePIN}+\text{beta}\times\text{Pctr\_inlinePIN}\},$$

where Pctr_inlinePIN is the predicted CTR of the supplier's product identification number (PIN) (e.g., predicted using a personalized deep interest network (DIN) model trained on inline ad engagement data), Pirrel_inlinePIN is a measure of irrelevance between the search query and PIN, and the bid is the CPC bid for a PIN click. In certain examples, the supplier's auction score is the max score across all their PINs from the supplier eligible for the auction.

In certain examples, data processing efficiency is enhanced by computing CTR and/or relevance estimates at a supplier's granularity (e.g., and not at the branded question granularity. For example, a supplier can have 5 aspects which it is known for (e.g., inferred via reviews and the supplier's inputs). In certain examples, the pill CTR and relevance computations are performed for the shopper's query and supplier (e.g., instead of 5 different estimates associated with each of the aspects). Certain examples herein cache the CTR and/or relevance estimates for frequently occurring shopper queries and suppliers associated with such queries to save computation costs and time for repetitive shopper queries, e.g., to enable low latency pills serving frequently occurring shopper queries. By not fanning out estimates to "branded" questions, certain examples herein reduce the memory needed for such caches.

In certain examples, the supplier targeting is based on both search keywords (e.g., "desk") and natural language targeting descriptions from the supplier (e.g., prompts) (for example, "I want to target shoppers looking for office furniture", mapped to potential search keywords, e.g., offline).

Caching

In certain examples, caching of CTR and relevance estimates saves computation time and cost. In certain examples, these computations of CTR and relevance estimates are done in a distributed setup (e.g., using a cluster of computing resources/GPUs), and using cached responses lessens the need to send data across the network for such a distributed computation.

Contextually Relevant (e.g., Top) Aspects of a Supplier

Certain examples herein determine (e.g., via ML model 130) the contextually relevant (e.g., having a contextual score greater than a threshold) (e.g., top) aspects for a supplier based on user reviews for that supplier, e.g., and then apply a filter based on the supplier's preferences as described herein. In certain examples, for each product (or service) ID (PIN) associated with a supplier, the ML model (e.g., LLM) infers top aspects using the review aspects dataset. In certain examples, an aspect can qualify as positive for a PIN if it has positive sentiment (e.g., positive reviews divided by total reviews) above a pre-determined threshold (e.g., >80% positive). In certain examples, the positive aspects for PONs under a supplier can be aggregated to infer top aspects for a supplier. The supplier may also provide an allow-list of aspects (e.g., design, durability, material, etc.) it wants to promote, and this can be used as an additional filter. In certain examples, a review aspects dataset can be used to infer the top positive aspects for a PIN. For a supplier, top aspects can be inferred by aggregating the top aspects for (e.g., all) PINs of the supplier. In certain examples, the supplier auction approach mitigates data sparsity in question level engagement data by using aggregates at a supplier level.

In certain examples, the ML model 130 (e.g., LLM) is trained to pick the most relevant top aspect for the given search context.

Question Generation for the Supplier and its Top Aspect

Certain examples herein prompt the MML model (e.g., LLM) to generate a question based on a supplier's selected aspect. The following are example prompts for question generation (e.g., in JavaScript Object Notation (JSON) format):

def create_prompt(Keyword, Supplier):
aspect=get_aspect(Supplier) ##top aspect for supplier
advertiser_context=get_context(Supplier, aspect) ##supplier inputs prompt=f"""<quote>Assume you are a shopping assistant. You have four inputs: (1) Keyword: A search query entered by a customer, (2) Supplier: A supplier which we want to promote, (3) Aspect: A specific aspect of the supplier that we want to highlight, and (4) Advertiser Context: Additional context about the supplier and its aspect. For a customer question, your job is to propose a related question in the form "Why is [Supplier] known for its [Aspect]?". See the following examples. The question length should not be too long.</quote>

<example>
<keyword>furniture</keyword>
<supplier>Supplier X</supplier>
<aspect>Design</aspect>
<advertiser_context>Supplier X is a high-end furniture supplier known for its modern and minimalist designs. Their furniture pieces are crafted with attention to detail and use premium materials.</advertiser_context>
<output_json>
{{"question": "Why is Supplier X known for its design?" }}
</output_json>
</example>
<example>
<keyword>running shoes</keyword>
<supplier>Supplier H</supplier>
<aspect>Cushioning</aspect>
<advertiser_context>Supplier H is a leading supplier in the running shoe industry, renowned for its innovative cushioning technology that provides superior shock absorption and comfort for runners.</advertiser_context>
<output_json>
{{"question": "Why is Supplier H known for its cushioning?" }}
</output_json>
</example>
<example>
<keyword>headphones</keyword>
<supplier>Supplier B</supplier>
<aspect>Noise Cancellation</aspect>
<advertiser_context>Supplier B is a pioneer in noise-cancelling technology, offering headphones that effec-

```
tively block out ambient noise for an immersive audio experience.</advertiser_context>
<output_json>
{{"question": "Why is Supplier B known for its noise cancellation?" }}
</output_json>
</example>
<negative_example>
<keyword>laptops</keyword>
<supplier>Supplier D</supplier>
<aspect>Performance</aspect>
<bad_output_json>
{{"question": "What are the detailed specs and benchmark scores of the latest Supplier D Model E laptop?" }}
</bad_output_json>
<comment>This question is too specific and detailed for a general shopping assistant.</comment>
</negative_example>
<prompt>For the following keyword, supplier, aspect, and advertiser context, create a question</prompt>
<keyword>{Keyword}</keyword>
<supplier>{Supplier}</supplier>
<aspect>{Aspect}</aspect>
<advertiser_context>{advertiser_context}</advertiser_context>
<instruction>Output in JSON format:</instruction>
"""
    return prompt
```

Retrieval of Reviews and Supplier Inputs for Top Aspect

In certain examples, a review retrieval ML model (e.g., CAIR) is a (e.g., T5) Transformer model for embedding review snippets, aspects, and supplier inputs. In one example, the T5 base checkpoint architecture consists of a 12-layer transformer encoder, an average pooling module, a dense layer with linear activation, and a normalization module, e.g., totaling 220 million parameters.

Figure 5:
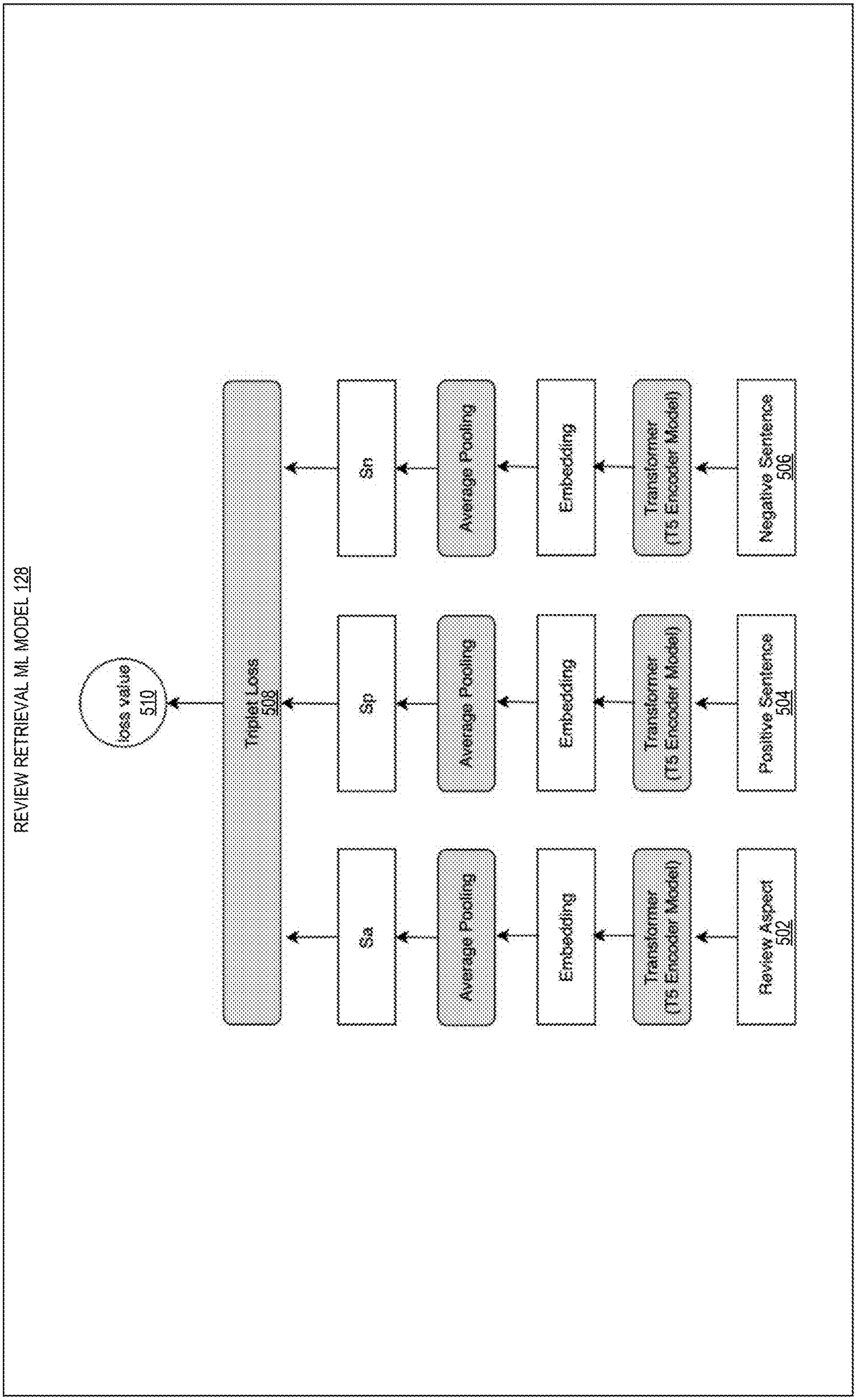
FIG. 5 is a diagram illustrating an architecture of a machine learning model for review retrieval according to some examples.

In certain examples, to improve the review retrieval ML model (e.g., CAIR) performance in a sponsored pills setup, a three-tower T5 transformer model (e.g., as shown in FIG. 5) is fine-tuned with user review data for retrieving content specific to a product aspect. In certain examples, such a fine-tuned ML model (e.g., CAIR) provides superior precision-recall, thus there is less chances of noise/irrelevant information being fed to the LLM via retrieval augmented generation, and hence leads to a more efficient utilization of the limited context window of certain LLMs.

In certain examples, the review retrieval ML model (e.g., CAIR) enhances data processing efficiency of an LLM by feeding only relevant inputs to the LLM for retrieval augmented generation. As a result, the LLM may end up processing fewer input tokens and incur lower processing (e.g., graphics processing unit (GPU)) usage cost.

In certain examples, the review retrieval ML model (e.g., CAIR) enhances real time optimization of LLM generated (e.g., for a pill) question and answer by pulling in relevant information and feeding it to the LLM for retrieval augmented generation. For example, recent reviews which the LLM may not have seen during training are available to it for pill response generation via the review retrieval ML model (e.g., CAIR) in certain examples.

In certain examples, such (e.g., sponsored) pills enhance user-interface functionality by allowing suppliers to influence the LLM response. The response in the pill may also include multimedia content (e.g., videos, audio) which are provided by the supplier.

In certain examples, an LLM has a limited context window, and a retrieval ML model (e.g., CAIR) is utilized to (1) ensure the pill's consistency with the latest review data (e.g., which may be a blind spot in an LLM's infrequent training), (2) enable the winning supplier/brand to influence the LLM's pill generation, and/or (3) provide relevant evidence to the LLM within its limited context window.

FIG. 5 is a diagram illustrating an architecture of a machine learning model 128 for review retrieval according to some examples. In certain examples, the ML model 128 takes a tuple of a review aspect 502, a positive example 504, and a negative example 506 as inputs, e.g., where the positive example is a review snippet that aligns with the review aspect, and the negative example is a review snippet that does not relate to the review aspect. In certain examples, a triplet loss 508 is used as the objective function for model fine-tuning, e.g., to minimize the loss value 510. In one example, the triplet loss 508 is defined as:

$$\Sigma i \max(\|Sa\_i-Sp\_i\|-\|Sa\_i-Sn\_i\|+\epsilon,0))$$

where Sa, Sp, and Sn are embeddings for review aspect, positive snippet, and negative snippet respectively, i is the training sample index, and c is a margin between positive and negative pairs. In certain examples, the labeled training data is derived from reviews annotated with aspects by an LLM.

Response Generation Using Retrieved Data (e.g., Retrieval Augmented Generation)

In certain examples, after obtain the retrieval results from the review retrieval ML model 128 (e.g., CAIR), the ML model 130 (e.g., LLM) is prompted to generate the pill's response in a retrieval augmented generation manner. The following is an examples prompts for response (e.g., answer) generation (e.g., in JSON format):

```
# use Hierarchical Navigable Small Worlds (HNSW) approximate nearest neighbors (ANN) search to return a list of a number of (e.g., 5) text snippets that are close to the question in the embedding space
context=ANN_search_hnsw(question, k=5, thresh=1)
context="\n\n".join(context)
prompt=f"""
Using the provided context to answer the question below. Only use context when it is helpful.
Question: {question}
Context:{context}"""
```

Conversation Continuation Pills

As shown in FIG. 6, conversation continuation pills are follow-up questions after a shopper starts engaging with conversational agent.

FIG. 6 is a diagram illustrating a graphical user interface 154 (GUI) presenting a question generated by a machine learning model and presenting the response to that question according to some examples. In certain examples, FIG. 6(*a*) illustrates an ingress 602 from a search in an application to a conversational agent service/system. In certain examples, the ingress 602 (e.g., search indication therefrom) is utilized by the conversational agent service/system (e.g., ML model(s) thereof) to generate a question 604 (e.g., according to FIG. 3 or FIG. 4) that is presented to the user. In certain examples, FIG. 6(*b*) illustrates a response 606 (e.g., answer) (e.g., in a pill) from the ML model (e.g., LLM) to the question 604. In certain examples, the response 608 also includes an image 610 of a product (e.g., a desk from Supplier-X (or Brand-X)) that relates to the response 606.

In certain examples, the architectures in FIGS. 3 and 4 can be generalized to conversation continuity pills, e.g., by using a "summarized query" from the prior conversational agent context instead of using the search query, e.g., obtained via an LLM summarizing the prior engagement. In certain examples, note that for both the pill question and response generation steps, if the LLM's context window is long enough, prior conversation history (e.g., last K turns in the conversational agent interaction history) can be used as additional retrieval augmented generation (RAG) inputs for generation.

Using Conversational Agent ML Model (E.G., LLM) to Generate Sponsored Pill Candidate Questions In certain examples of the architecture in FIG. 4, the pill question is constrained to be around aspects. Other examples relax this constraint by asking the conversational agent ML model (e.g., LLM) to generate branded pill question candidates for the suppliers, e.g., in auction. In certain examples of the supplier auction approach, this is done (e.g., only) for the selected (e.g., winning) supplier while for a branded question auction this will be done for all candidate suppliers.

Personalization of Sponsored Pills

Certain examples herein personalize sponsored pills by using a personalized CTR prediction model for the questions/pills (e.g., for the auction values explained above). In certain examples, the personalized CTR prediction model has a deep neural network architecture (e.g., deep-interest network) which takes into account past interaction history (e.g., the pills and products that the shopper interacted with in a period of time (e.g., the last 4 weeks)). For example, if a shopper is generally interested is the design aspect (e.g., has clicked only design related pills in the past), and supplier X has questions on both design and material aspects, the CTR prediction model should ideally favor the design related question.

Extension for Non-Search Contexts (Detail Page and Home Page Pills)

In certain examples, the branded question auction approach (e.g., in FIG. 3) is extended to rank pill questions for a product's detail page (e.g., a detail page of an online retailer). In certain examples, the questions are candidates generated by the LLM, and may be from the same supplier as that of the detail page PIN (e.g., the questions can be for upselling new products) or they may be from other suppliers (e.g., the question can be for similar products from other suppliers). IN certain example, the (e.g., CAIR) ML model based retrieval is used for generating responses for such questions based on product sales/review data and supplier inputs. In a similar manner, the proposed approaches can be generalized for pills for the home page (e.g., candidate questions for suppliers eligible for home page can be ranked via these approaches, and their responses can be generated via (e.g., CAIR) ML model based retrieval).

Multimodal (e.g., Text, Image Audio, Video) Pill Responses

In certain examples, the pill responses are made multimodal. In certain examples, a supplier provides multiple image, video and audio assets for assisting pill response generation. In certain examples, the (e.g., CAIR) ML model's retrieval is textual in nature and can retrieve relevant supplier assets using their textual titles for a given context. In certain examples, the retrieved titles uniquely identify the assets which can then be rendered together (e.g., as shown in FIG. 2) with the LLM's textual response.

Dynamic Placement of Organic and Sponsored Pills

In certain examples, a sponsored pill is placed at the end of other (e.g., "organic") pills, e.g., pills not generated by the ML models of this disclosure. In certain examples, the position of the sponsored pill is dynamic in nature. In certain examples, the conversational agent ML model (e.g., LLM) sorts the set of organic and sponsored pills in order of relevance to the shopper. Alternatively, there can be a separate ranker which ranks the pills based on expected engagement and conversions/purchases driven by the pills.

Ensuring Information from RAG Fits within the Context Window of an LLM

To efficiently use an LLM's limited context window for retrieval augmented generation, examples herein focus on retrieving information which is relevant to the LLM's current task. For example, consider a task where the LLM is to answer a question about "durability" aspect of a supplier. If the supplier has 1000 reviews, and only 50 of them are related to durability, the proposed retrieval system (e.g., CAIR) can be set to fetch only the 50 reviews related to durability (e.g., hence minimizing the RAG input to the LLM). Furthermore, in certain examples, the retrieved results are ranked by their relevance to the LLM's task (e.g., an embedding similarity score capturing how related the reviews are to the aspect durability). In case the LLM's context window cannot accommodate all retrieved results (e.g., 50 reviews in this example), the results are sorted by their relevance score to select the top K results which fit into the context window. For retrieval results with identical relevance scores, metadata like recency can be used to break ties (e.g., prioritizing recent reviews over older ones).

Superior precision-recall performance translates to less chances of noise/irrelevant information being fed to the LLM via RAG, and hence leads to a more efficient utilization of the limited context window.

Mobile Application Versus Desktop Application

For a selection (e.g., auction) step, certain examples herein estimate the CTR for a pill/question. This can be different for mobile and desktop (e.g., the layout structure might lead to different shopper perception around the pills/have different degrees of position bias). To mitigate such challenges. Certain examples herein train separate mobile and desktop pill CTR models.

ML Model Creation, Training, and Use

Figure 7:
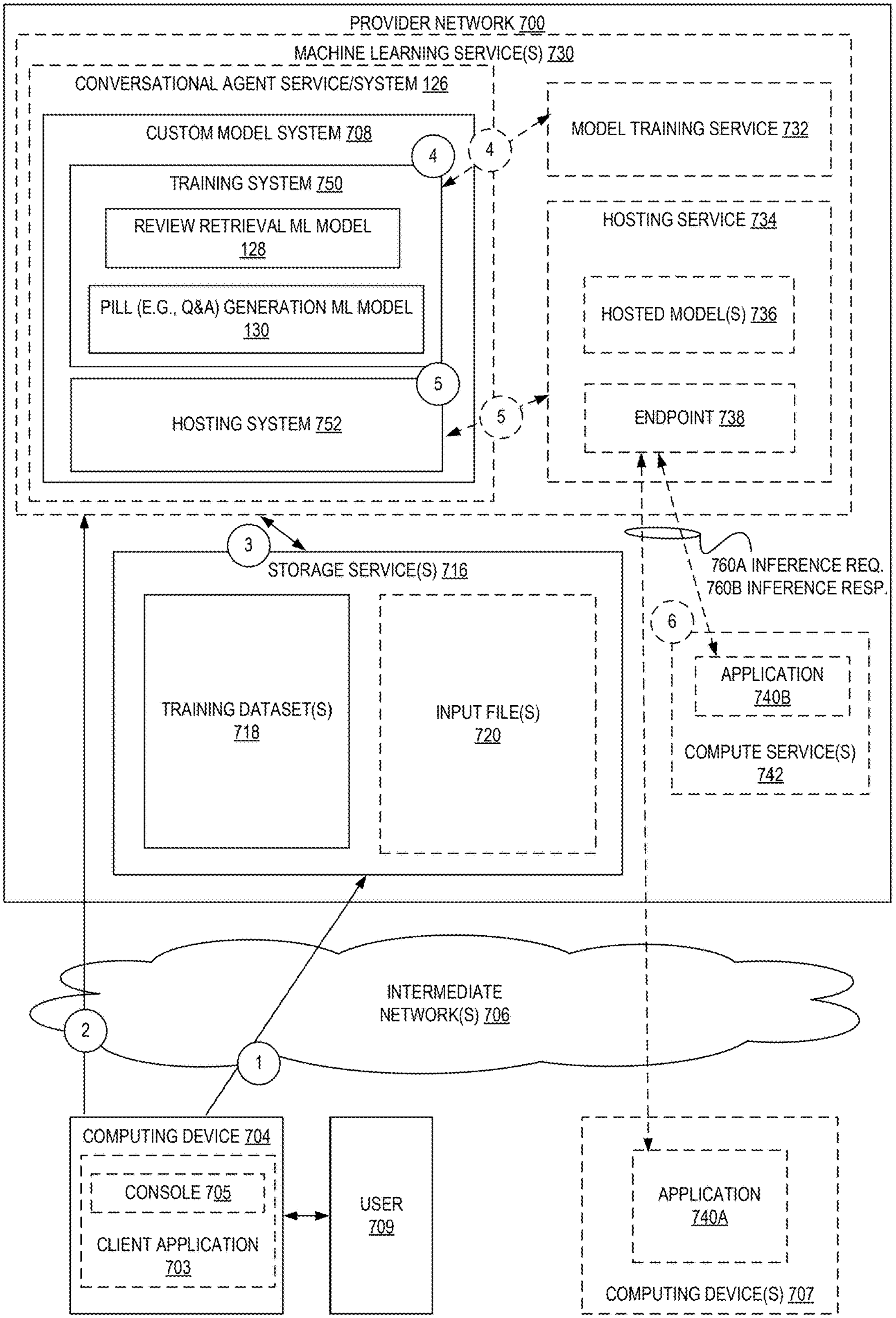
FIG. 7 is a diagram illustrating an environment for creating, training, and using one or more machine learning models according to some examples.

FIG. 7 is a diagram illustrating an environment for creating, training, and using one or more machine learning models according to some examples. FIG. 7 includes one or more conversational agent service/system 126, one or more storage services 716, one or more machine learning services 730, and one or more compute services 742 implemented within a multi-tenant provider network 700. Each of the one or more conversational agent service/system 126, one or more storage services 716, one or more machine learning services 730, and one or more compute services 742 may be implemented via software, hardware, or a combination of both, and may be implemented in a distributed manner using multiple different computing devices.

A provider network 700 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances or a serverless code execution service that executes code (either of which may be referred to herein as a compute service 742), a storage service 716 that can store data objects, etc. The users (or "customers") of provider networks 700 may utilize one or more user accounts that are associated with a customer account, though these terms may be used somewhat interchangeably depending upon the context of use. Users may interact with a provider network 700 across one or more intermediate networks 706 (e.g., the internet) via one or more interface(s), such as through use of application programming interface (API) calls, via a console 705 implemented as a website or application, etc. The interface(s) may be part of, or serve as a front-end to, a control plane of the provider network 700 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 700 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

For example, in various examples, a "serverless" function may include code provided by a user or other entity—such as the provider network itself—that can be executed on demand. Serverless functions may be maintained within provider network 700 by an on-demand code execution service (which may be one of compute service(s) 742) and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some examples, a serverless function can be invoked through an application programming interface (API) call or a specially formatted HyperText Transport Protocol (HTTP) request message. Accordingly, users can define serverless functions (e.g., as an application 740B) that can be executed on demand, without requiring the user to maintain dedicated infrastructure to execute the serverless function. Instead, the serverless functions can be executed on demand using resources maintained by the provider network 700. In some examples, these resources may be maintained in a "ready" state (e.g., having a pre-initialized runtime environment configured to execute the serverless functions), allowing the serverless functions to be executed in near real time.

The conversational agent service/system 126, in some examples, is a machine learning powered service that provides pills (e.g., question and answer pairs) for a conversational agent, e.g., based on an input from a user (e.g., a search indication, etc.), for example, the pills (e.g., question and answer pairs) generated by pill (e.g., Q&A) generation ML model 130, e.g., as discussed herein. In certain examples, the conversational agent service/system 126 includes a review retrieval ML model 128, e.g., a CAIR model as discussed herein.

The training system 750, for example, may enable users to generate one or more machine learning models (e.g., pill (e.g., Q&A) generation ML model 130 and/or review retrieval ML model 128) that outputs a pill (e.g., question and answer pair) for a conversational agent, e.g., as discussed in reference to FIG. 3 and/or FIG. 4. In certain examples, the training system 750 enables users to generate pill (e.g., Q&A) generation ML model 130 and/or review retrieval ML model 128.

Examples herein allow for the creation of pill (e.g., Q&A) generation ML model 130 and/or review retrieval ML model 128 by supplying a training dataset 718 (for example, one or more sets of question and answer pairs, user based content (e.g., reviews), product/service data, and other supplier data (e.g., brand data)). Further examples of training datasets are discussed below.

In some examples, the conversational agent service/system 126—via use of a custom model system 708—allows users to build and use pill (e.g., Q&A) generation ML model 130 and/or review retrieval ML model 128.

At a high level, machine learning may include two major components that are required to be put in place in order to expose advertised functionality to the customer: (i) training and (ii) inference. Training may include the following responsibilities: training data analysis; data split (training, evaluating (e.g., development or validation), and/or testing data); model selection; model training; model evaluation; and status reporting. Inference may include the following responsibilities: model loading and hosting; and inference (e.g., synchronous and batch).

Training may include training a candidate algorithm into model(s), e.g., into pill (e.g., Q&A) generation ML model 130 and/or review retrieval ML model 128, and respective configurations (e.g., coefficients and/or hyperparameters). Training may perform a grid search over the matrix of experiments (e.g., defined upfront) in search for the model and its parameters (e.g., hyperparameters) that performs best on the given dataset.

Thus, a user 709 may provide or otherwise identify data 718 for use in creating a custom model. For example, as shown at circle (1), the user 709 may utilize a client application 703 executed by a computing device 704 (e.g., a web-application implementing a console 705 for the provider network 700, a standalone application, another web-application of another entity that utilizes the conversational agent service/system 126 as a part of its backend, a database or mixed-SQL environment, etc.) to cause the computing device 704 to upload the data 718 to a storage location (e.g., provided by a storage service 716 such as an object storage service of a provider network 700).

The data 718 may be a columnar dataset that includes rows (or entries) of data values, where the data values may be arranged according to one or more columns (or attributes) and may be of a same datatype (e.g., one storing text). In some cases, the data 718 includes headings or other metadata describing names or datatypes of the columns, though in some cases this metadata may not exist. For example, some or all of the data 718 may have been provided by a user as a plaintext file (e.g., a comma-separated values (CSV) or tab-separated values (TSV) file), an exported database table or structure, an application-specific file such as a spreadsheet, etc.

For example, when a user 709 desires to train a model 130, this file (or files) may include labels corresponding to the file (e.g., question and answer pairs, engagement data, etc.), e.g., with a label indicating category(ies) of content in the file.

Thereafter, at circle (2) the computing device 704 may issue one or more requests (e.g., API calls) to the machine learning service 730 that indicate the user's 709 desire to train one or more algorithms into model(s), e.g., into pill (e.g., Q&A) generation ML model 130 and/or review retrieval ML model 128. The request may be of a type that identifies which type of model(s) are to be created or identifies that the machine learning service 730 itself is to identify the candidate pill (e.g., Q&A) generation ML model 130 and/or candidate review retrieval ML model 128. The request may also include one or more of an identifier of a storage location or locations storing the data 718, which may identify a storage location (e.g., via a Uniform Resource Locator (URL), a bucket/folder identifier, etc.) within the provider network 700 (e.g., as offered by a storage service 716) or external to the provider network 700, a format identifier of the data 718, a language identifier of the language of any labels, etc. In some examples, the request includes an identifier (e.g., from the user 709) of the candidate algorithm(s) themselves within the request.

Responsive to receipt of the request, the custom model system 708 of the machine learning service 730 is invoked and begins operations for training the corresponding type of model. For example, the custom model system 708 may identify what type of model is to be trained (e.g., via analyzing the method call associated with the request), the storage location(s) associated with the data 718, etc. Thus, the custom model system 708 may retrieve any stored data 718 elements as shown at circle (3), which may be from a storage location within the provider network 700 or external to the provider network 700.

In some examples, the training (at circle (4)) of pill (e.g., Q&A) generation ML model 130 and/or review retrieval ML model 128, includes performing (at optional, dotted circle (4A)) by training service 732 of machine learning service 730 a particular training job (e.g., hyperparameter optimization tuning job), or the like.

In some examples, the hosting system 752 (at circle (5)) of the custom model system 708 may make use (at optional, dotted circle (5)) of a hosting service 734 of a machine learning service 730 to deploy a model as a hosted model 736 in association with an endpoint 738 that can receive inference requests from client applications 740A and/or 740B at circle (8), provide the inference requests 760A to the associated hosted model(s) 736, and provide inference results 760B (e.g., a prediction, including, but not limited to, an asset (e.g., secondary content), back to applications 740A and/or 740B, which may be executed by one or more computing devices 707 outside of the provider network 700 or by one or more computing devices of a compute service 742 (e.g., hardware virtualization service, serverless code execution service, etc.) within the provider network 700. Inference results 760B may be displayed to a user and/or viewer (e.g., in a graphical user interface of the application) and/or exported as a data structure (e.g., in a selected format). In certain examples, the inference results are utilized by a secondary content insertion service 118 to insert secondary content (e.g., an image or video) into an input file 720 and/or publish the secondary content (e.g., as part of the file 720) based at least in part on the inference results (e.g., the publishing parameter(s)).

Example Flow

FIG. 8 is a flow diagram illustrating operations 800 of a method of utilizing a search indication to create a question and answer pair by one or more machine learning models according to some examples. Some or all of the operations 800 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some examples, one or more (or all) of the operations 800 are performed by a provider network that includes a pill (e.g., Q&A) generation ML model 130 and/or review retrieval ML model 128 of the other figures.

The operations 800 include, at block 802, receiving an indication from a user. The operations 800 further include, at block 804, determining a plurality of corresponding aspects for a plurality of suppliers based on a set of user based content. The operations 800 further include, at block 806, generating, by one or more machine learning models, one or more contextually relevant aspects from the plurality of corresponding aspects based on the indication for individual ones of the plurality of suppliers. The operations 800 further include, at block 808, generating, by the one or more machine learning models, a corresponding supplier related question for the individual ones of the plurality of suppliers based on the one or more contextually relevant aspects. The operations 800 further include, at block 810, selecting a supplier related question from the corresponding supplier related questions. The operations 800 further include, at block 812, generating, by the one or more machine learning models, a corresponding answer to the supplier related question based on one or more of the set of user based content. The operations 800 further include, at block 814, causing the supplier related question and the corresponding answer to be presented the user.

At least some examples of the disclosed technologies can be described in view of the following examples:

Example 1. A computer-implemented method comprising:
receiving, by a conversational agent service, a search query from a user;
selecting, by the conversational agent service, a supplier from a plurality of suppliers based on a relevance of the supplier to the search query;
determining, by the conversational agent service, a plurality of aspects for the supplier based on a set of user reviews;
generating, in real time by one or more machine learning models of the conversational agent service, one or more contextually relevant aspects from the plurality of aspects based on the search query;
generating, in real time by the one or more machine learning models of the conversational agent service, a supplier related question and corresponding answer based on the one or more contextually relevant aspects; and
presenting, by the conversational agent service, the supplier related question in real time and the corresponding answer to the user.

Example 2. The computer-implemented method of example 1, wherein the selecting the supplier comprises:
determining a corresponding predicted click-through value based on the search query for the plurality of suppliers; and
determining the supplier based on the corresponding predicted click-through values.

Example 3. The computer-implemented method of example 1, wherein the presenting comprises:
presenting the supplier related question to the user; and
presenting the corresponding answer in response to an indication received from the user.

Example 4. A computer-implemented method comprising:
receiving an indication from a user;
determining a plurality of corresponding aspects for a plurality of suppliers based on a set of user based content;
generating, by one or more machine learning models, one or more contextually relevant aspects from the plurality of corresponding aspects based on the indication for individual ones of the plurality of suppliers;
generating, by the one or more machine learning models, a corresponding supplier related question for the individual ones of the plurality of suppliers based on the one or more contextually relevant aspects;
selecting a supplier related question from the corresponding supplier related questions;
generating, by the one or more machine learning models, a corresponding answer to the supplier related question based on one or more of the set of user based content; and
causing the supplier related question and the corresponding answer to be presented the user.

Example 5A. The computer-implemented method of example 4, wherein the supplier related question is for a product of the supplier.

Example 5B. The computer-implemented method of example 4, wherein the supplier related question is for a brand of the supplier.

Example 6. The computer-implemented method of example 4, wherein the generating, by the one or more machine learning models, the corresponding answer to the supplier related question is also based on an input of supplier guidelines into the one or more machine learning models.

Example 7. The computer-implemented method of example 4, wherein the selecting the supplier related question comprises:
determining a corresponding predicted click-through value for the indication for the corresponding supplier related questions; and
determining the supplier related question based on the corresponding predicted click-through values.

Example 8. The computer-implemented method of example 4, wherein the indication is a search query from the user.

Example 9. The computer-implemented method of example 4, wherein the indication is an access of an online shopping page for a product.

Example 10. The computer-implemented method of example 4, further comprising updating a cached version of the set of user based content in response to receiving the indication.

Example 11. The computer-implemented method of example 4, wherein the causing the supplier related question and the corresponding answer to be presented the user comprises:
causing the supplier related question to be presented to the user; and
causing the corresponding answer to be presented to the user in response to another indication received from the user.

Example 12. The computer-implemented method of example 4, further comprising causing one or more other questions generated by a conversational agent service to be presented to the user with the supplier related question.

Example 13. The computer-implemented method of example 12, further comprising ranking, by the one or more machine learning models, the supplier related question and the one or more other questions, and causing the supplier related question and the one or more other questions to be presented based on the ranking.

Example 14. The computer-implemented method of example 4, further comprising determining the one or more of the set of user based content, by the one or more machine learning models, based on the one or more contextually relevant aspects.

Example 15. A non-transitory computer-readable medium storing code that, when executed by a device, causes the device to perform a method comprising:
in response to receiving an indication from a user, determining a plurality of corresponding aspects for a plurality of suppliers based on a set of user based content;
generating, by one or more machine learning models, one or more contextually relevant aspects from the plurality of corresponding aspects based on the indication for individual ones of the plurality of suppliers;

generating, by the one or more machine learning models, a corresponding supplier related question for the individual ones of the plurality of suppliers based on the one or more contextually relevant aspects;

selecting a supplier related question from the corresponding supplier related questions;

generating, by the one or more machine learning models, a corresponding answer to the supplier related question based on one or more of the set of user based content; and causing the supplier related question and the corresponding answer to be presented the user.

Example 16. The non-transitory computer-readable medium of example 15, wherein the selecting the supplier related question comprises:

determining a corresponding predicted click-through value for the indication for the corresponding supplier related questions; and determining the supplier related question based on the corresponding predicted click-through values.

Example 17. The non-transitory computer-readable medium of example 15, wherein the method further comprises updating a cached version of the set of user based content in response to receiving the indication.

Example 18. The non-transitory computer-readable medium of example 15, wherein the causing the supplier related question and the corresponding answer to be presented the user comprises:

causing the supplier related question to be presented to the user; and causing the corresponding answer to be presented to the user in response to another indication received from the user.

Example 19. The non-transitory computer-readable medium of example 15, wherein the method further comprises causing one or more other questions generated by a conversational agent service to be presented to the user with the supplier related question.

Example 20. The non-transitory computer-readable medium of example 19, wherein the method further comprises ranking, by the one or more machine learning models, the supplier related question and the one or more other questions, and causing the supplier related question and the one or more other questions to be presented based on the ranking.

Exemplary environments, systems, etc. that the above may be used in are detailed below.

Figure 9:
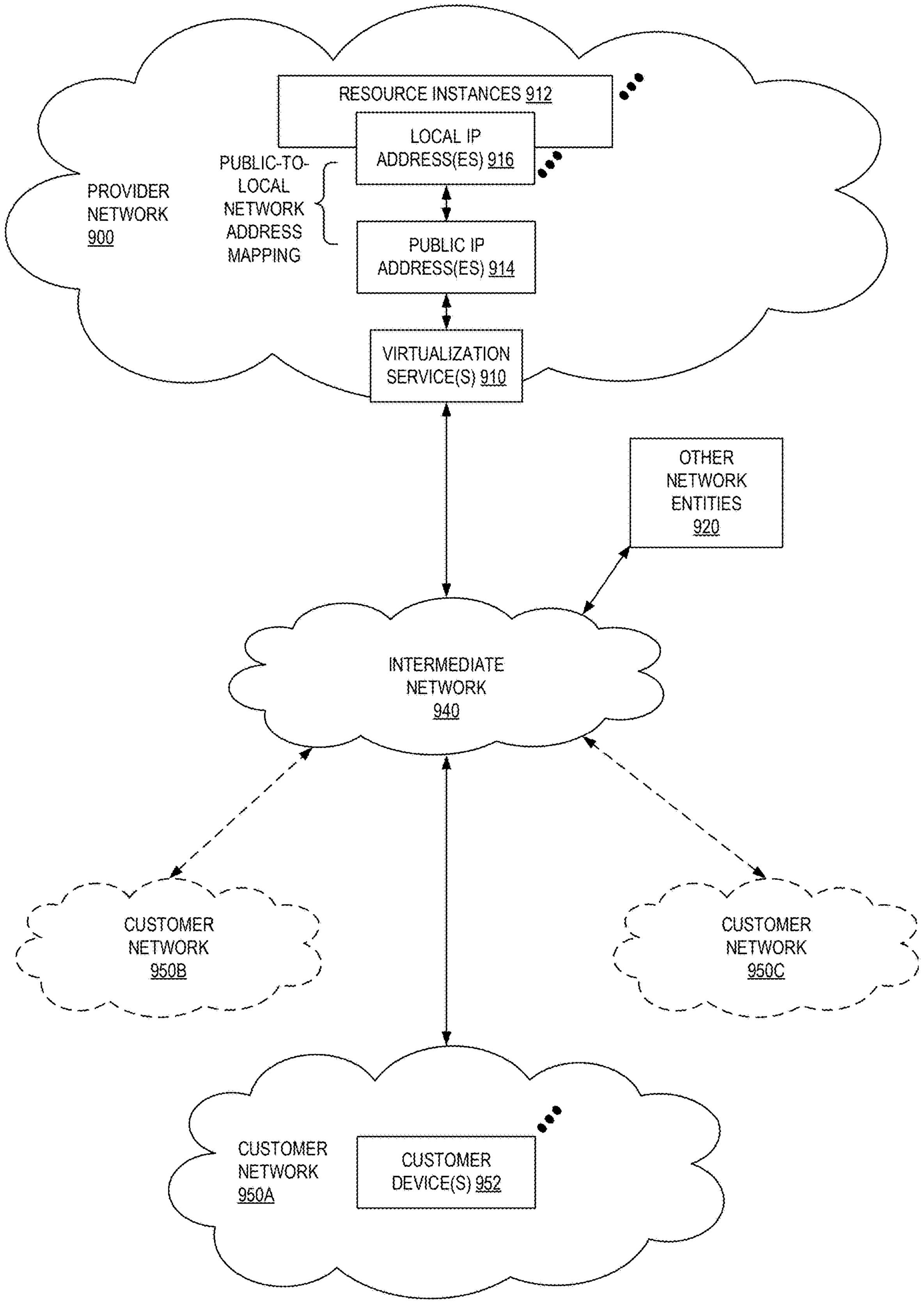
FIG. 9 illustrates an example provider network environment according to some examples.

FIG. 9 illustrates an example provider network (or "service provider system") environment according to some examples. A provider network 900 may provide resource virtualization to customers via one or more virtualization services 910 that allow customers to purchase, rent, or otherwise obtain instances 912 of virtualized resources, including but not limited to computation and storage resources, implemented on devices within the provider network or networks in one or more data centers. Local Internet Protocol (IP) addresses 916 may be associated with the resource instances 912; the local IP addresses are the internal network addresses of the resource instances 912 on the provider network 900. In some examples, the provider network 900 may also provide public IP addresses 914 and/or public IP address ranges (e.g., Internet Protocol version 4 (IPv4) or Internet Protocol version 6 (IPv6) addresses) that customers may obtain from the provider 900.

Conventionally, the provider network 900, via the virtualization services 910, may allow a customer of the service provider (e.g., a customer that operates one or more client networks 950A-950C including one or more customer device(s) 952) to dynamically associate at least some public IP addresses 914 assigned or allocated to the customer with particular resource instances 912 assigned to the customer. The provider network 900 may also allow the customer to remap a public IP address 914, previously mapped to one virtualized computing resource instance 912 allocated to the customer, to another virtualized computing resource instance 912 that is also allocated to the customer. Using the virtualized computing resource instances 912 and public IP addresses 914 provided by the service provider, a customer of the service provider such as the operator of customer network(s) 950A-950C may, for example, implement customer-specific applications and present the customer's applications on an intermediate network 940, such as the Internet. Other network entities 920 on the intermediate network 940 may then generate traffic to a destination public IP address 914 published by the customer network(s) 950A-950C; the traffic is routed to the service provider data center, and at the data center is routed, via a network substrate, to the local IP address 916 of the virtualized computing resource instance 912 currently mapped to the destination public IP address 914. Similarly, response traffic from the virtualized computing resource instance 912 may be routed via the network substrate back onto the intermediate network 940 to the source entity 920.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some examples, the mapping of a standard IP address to a local IP address of a resource instance is the default launch configuration for all resource instance types.

At least some public IP addresses may be allocated to or obtained by customers of the provider network 900; a customer may then assign their allocated public IP addresses to particular resource instances allocated to the customer. These public IP addresses may be referred to as customer public IP addresses, or simply customer IP addresses. Instead of being assigned by the provider network 900 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 10:
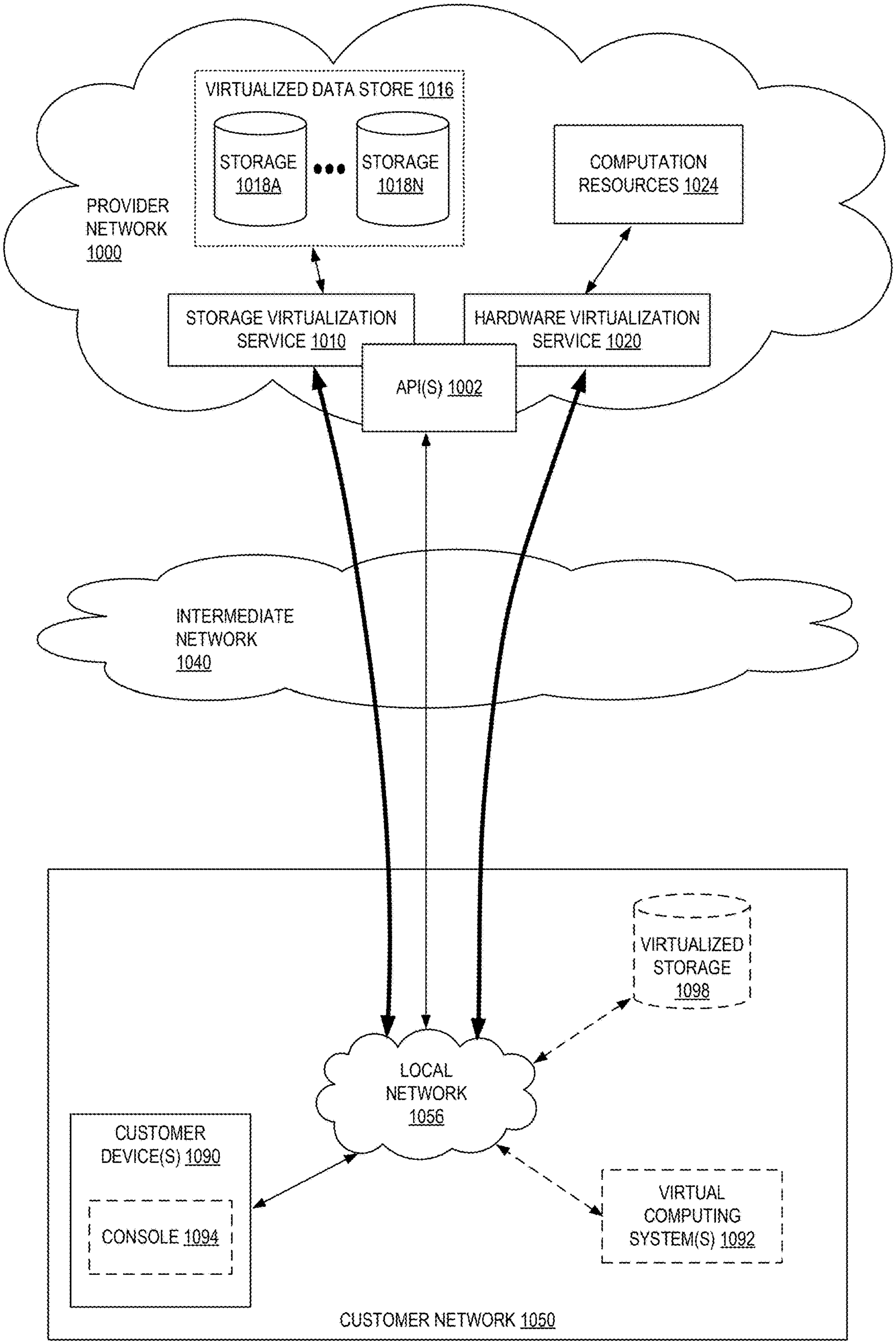
FIG. 10 is a block diagram of an example provider network that provides a storage service and a hardware virtualization service to customers according to some examples.

FIG. 10 is a block diagram of an example provider network that provides a storage service and a hardware virtualization service to customers, according to some examples. Hardware virtualization service 1020 provides multiple computation resources 1024 (e.g., VMs) to customers. The computation resources 1024 may, for example, be rented or leased to customers of the provider network 1000 (e.g., to a customer that implements customer network 1050). Each computation resource 1024 may be provided with one or more local IP addresses. Provider network 1000 may be configured to route packets from the local IP addresses of the computation resources 1024 to public Internet destinations, and from public Internet sources to the local IP addresses of computation resources 1024.

Provider network 1000 may provide a customer network 1050, for example coupled to intermediate network 1040 via local network 1056, the ability to implement virtual computing systems 1092 via hardware virtualization service 1020 coupled to intermediate network 1040 and to provider network 1000. In some examples, hardware virtualization service 1020 may provide one or more APIs 1002, for example a web services interface, via which a customer network 1050 may access functionality provided by the hardware virtualization service 1020, for example via a console 1094 (e.g., a web-based application, standalone application, mobile application, etc.). In some examples, at the provider network 1000, each virtual computing system 1092 at customer network 1050 may correspond to a computation resource 1024 that is leased, rented, or otherwise provided to customer network 1050.

From an instance of a virtual computing system 1092 and/or another customer device 1090 (e.g., via console 1094), the customer may access the functionality of storage service 1010, for example via one or more APIs 1002, to access data from and store data to storage resources 1018A-1018N of a virtual data store 1016 (e.g., a folder or "bucket", a virtualized volume, a database, etc.) provided by the provider network 1000. In some examples, a virtualized data store gateway (not shown) may be provided at the customer network 1050 that may locally cache at least some data, for example frequently-accessed or critical data, and that may communicate with storage service 1010 via one or more communications channels to upload new or modified data from a local cache so that the primary store of data (virtualized data store 1016) is maintained. In some examples, a user, via a virtual computing system 1092 and/or on another customer device 1090, may mount and access virtual data store 1016 volumes via storage service 1010 acting as a storage virtualization service, and these volumes may appear to the user as local (virtualized) storage 1098.

While not shown in FIG. 10, the virtualization service(s) may also be accessed from resource instances within the provider network 1000 via API(s) 1002. For example, a customer, appliance service provider, or other entity may access a virtualization service from within a respective virtual network on the provider network 1000 via an API 1002 to request allocation of one or more resource instances within the virtual network or within another virtual network.

Illustrative System

Figure 11:
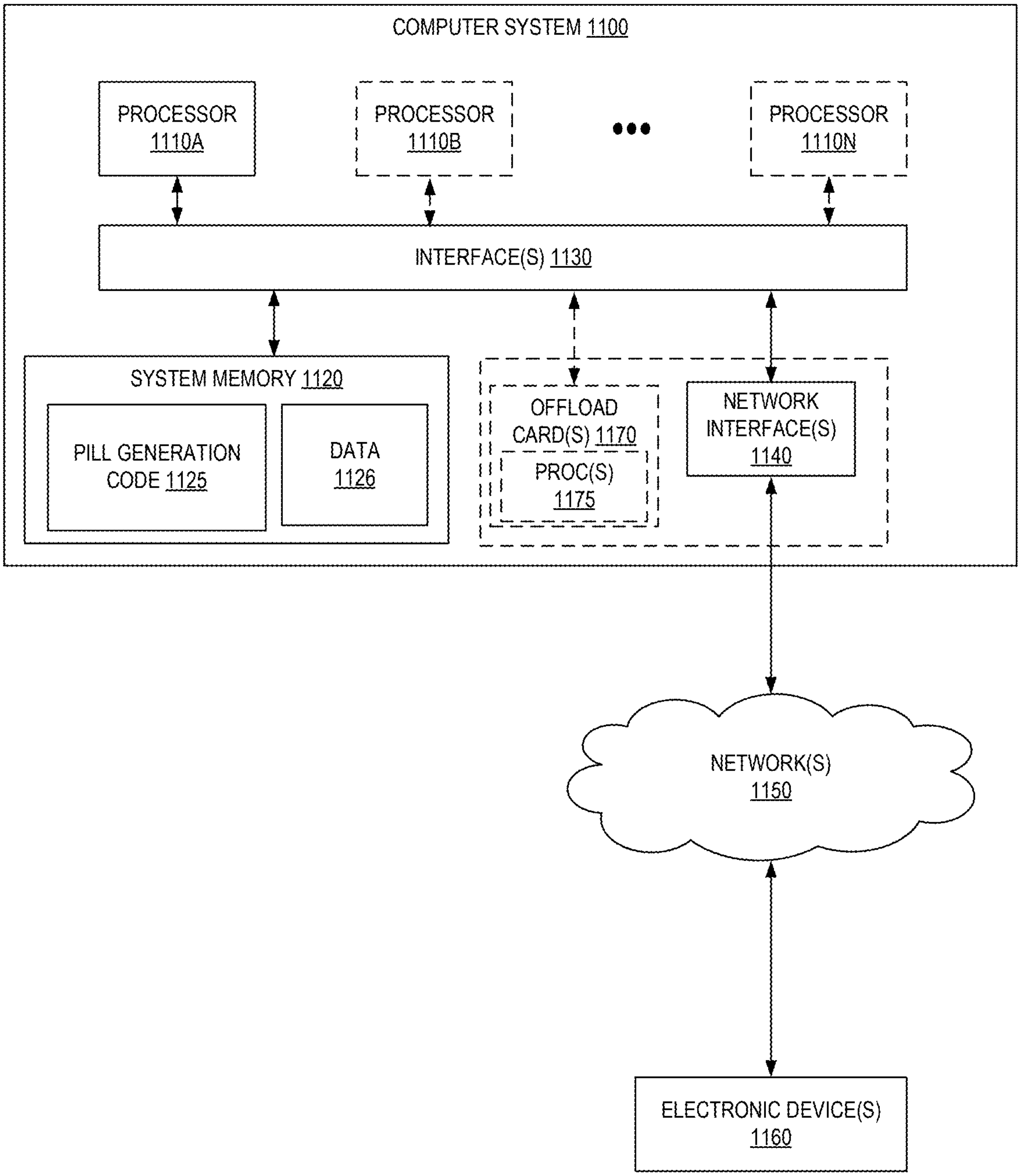
FIG. 11 is a block diagram illustrating an example computer system that may be used in some examples.

In some examples, a system that implements a portion or all of the techniques for content indexing as described herein may include a general-purpose computer system that includes or is configured to access one or more computer-accessible media, such as computer system 1100 illustrated in FIG. 11. In the illustrated example, computer system 1100 includes one or more processors 1110 coupled to a system memory 1120 via an input/output (I/O) interface 1130. Computer system 1100 further includes a network interface 1140 coupled to I/O interface 1130. While FIG. 11 shows computer system 1100 as a single computing device, in various examples a computer system 1100 may include one computing device or any number of computing devices configured to work together as a single computer system 1100.

In various examples, computer system 1100 may be a uniprocessor system including one processor 1110, or a multiprocessor system including several processors 1110 (e.g., two, four, eight, or another suitable number). Processors 1110 may be any suitable processors capable of executing instructions. For example, in various examples, processors 1110 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1110 may commonly, but not necessarily, implement the same ISA.

System memory 1120 may store instructions and data accessible by processor(s) 1110. In various examples, system memory 1120 may be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above are shown stored within system memory 1120 as pill generation code 1125 (e.g., executable to implement, in whole or in part, the operations discussed herein) and data 1126.

In one example, I/O interface 1130 may be configured to coordinate I/O traffic between processor 1110, system memory 1120, and any peripheral devices in the device, including network interface 1140 or other peripheral interfaces. In some examples, I/O interface 1130 may perform any necessary protocol, timing, or other data transformations to convert data signals from one component (e.g., system memory 1120) into a format suitable for use by another component (e.g., processor 1110). In some examples, I/O interface 1130 may include support for devices attached through various types of peripheral buses, such as a variant of the Peripheral Component Interconnect (PCI) bus standard or the Universal Serial Bus (USB) standard, for example. In some examples, the function of I/O interface 1130 may be split into two or more separate components, such as a north bridge and a south bridge, for example. Also, in some examples some or all of the functionality of I/O interface 1130, such as an interface to system memory 1120, may be incorporated directly into processor 1110.

Network interface 1140 may be configured to allow data to be exchanged between computer system 1100 and other devices 1160 attached to a network or networks 1150, such as other computer systems or devices as illustrated in FIG. 1, for example. In various examples, network interface 1140 may support communication via any suitable wired or wireless general data networks, such as types of Ethernet network, for example. Additionally, network interface 1140 may support communication via telecommunications/telephony networks such as analog voice networks or digital fiber communications networks, via storage area networks (SANs) such as Fibre Channel SANs, or via I/O any other suitable type of network and/or protocol.

In some examples, a computer system 1100 includes one or more offload cards 1170 (including one or more processors 1175, and possibly including the one or more network interfaces 1140) that are connected using an I/O interface 1130 (e.g., a bus implementing a version of the Peripheral Component Interconnect-Express (PCI-E) standard, or another interconnect such as a QuickPath interconnect (QPI) or UltraPath interconnect (UPI)). For example, in some examples the computer system 1100 may act as a host electronic device (e.g., operating as part of a hardware virtualization service) that hosts compute instances, and the one or more offload cards 1170 execute a virtualization manager that can manage compute instances that execute on the host electronic device. As an example, in some examples the offload card(s) 1170 can perform compute instance management operations such as pausing and/or un-pausing compute instances, launching and/or terminating compute instances, performing memory transfer/copying operations, etc. These management operations may, in some examples, be performed by the offload card(s) 1170 in coordination with a hypervisor (e.g., upon a request from a hypervisor) that is executed by the other processors 1110A-1110N of the computer system 1100. However, in some examples the virtualization manager implemented by the offload card(s) 1170 can accommodate requests from other entities (e.g., from compute instances themselves), and may not coordinate with (or service) any separate hypervisor.

In some examples, system memory 1120 may be one example of a computer-accessible medium configured to store program instructions and data as described above. However, in other examples, program instructions and/or data may be received, sent, or stored upon different types of computer-accessible media. Generally speaking, a computer-accessible medium may include non-transitory storage media or memory media such as magnetic or optical media, e.g., disk or DVD/CD coupled to computer system 1100 via I/O interface 1130. A non-transitory computer-accessible storage medium may also include any volatile or non-volatile media such as RAM (e.g., SDRAM, double data rate (DDR) SDRAM, SRAM, etc.), read only memory (ROM), etc., that may be included in some examples of computer system 1100 as system memory 1120 or another type of memory. Further, a computer-accessible medium may include transmission media or signals such as electrical, electromagnetic, or digital signals, conveyed via a communication medium such as a network and/or a wireless link, such as may be implemented via network interface 1140.

Figure 12:
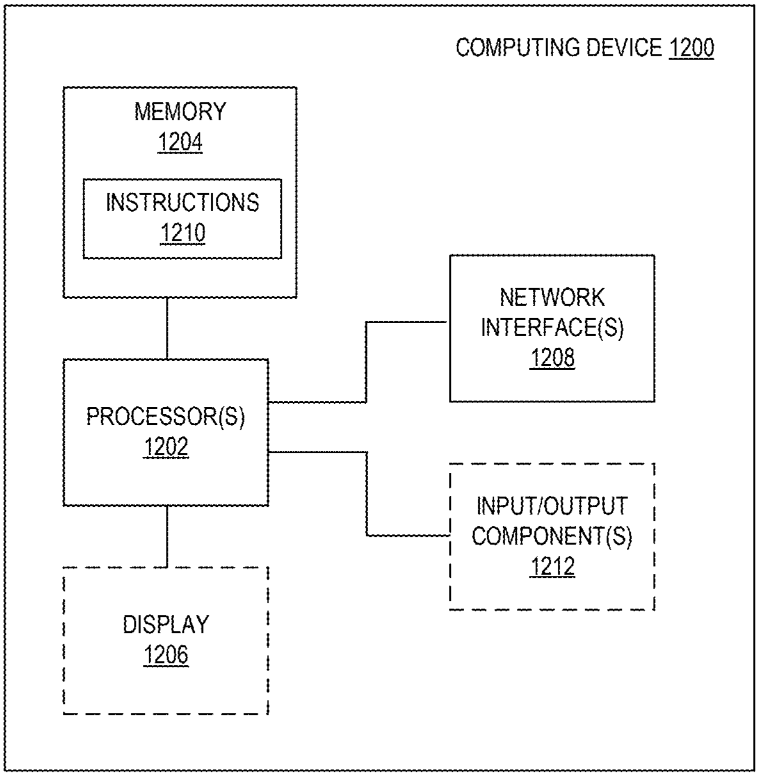
FIG. 12 illustrates a logical arrangement of a set of general components of an exemplary computing device that can be utilized in accordance with various examples.

FIG. 12 illustrates a logical arrangement of a set of general components of an example computing device 1200. Generally, a computing device 1200 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 1202 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 1204) to store code (for example, instructions 1210, e.g., which implement a content delivery service as disclosed herein), and a set of one or more wired or wireless network interfaces 1208 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 1204) of a given electronic device typically stores code (e.g., instructions 1210) for execution on the set of one or more processors 1202 of that electronic device. One or more parts of various examples may be implemented using different combinations of software, firmware, and/or hardware.

A computing device 1200 can include some type of display element 1206, such as a touch screen or liquid crystal display (LCD), although many devices such as portable media players might convey information via other means, such as through audio speakers, and other types of devices such as server end stations may not have a display element 1206 at all. As discussed, some computing devices used in some examples include at least one input and/or output component(s) 1212 able to receive input from a user. This input component can include, for example, a push button, touch pad, touch screen, wheel, joystick, keyboard, mouse, keypad, or any other such device or element whereby a user is able to input a command to the device. In some examples, however, such a device might be controlled through a combination of visual and/or audio commands and utilize a microphone, camera, sensor, etc., such that a user can control the device without having to be in physical contact with the device.

Figure 13:
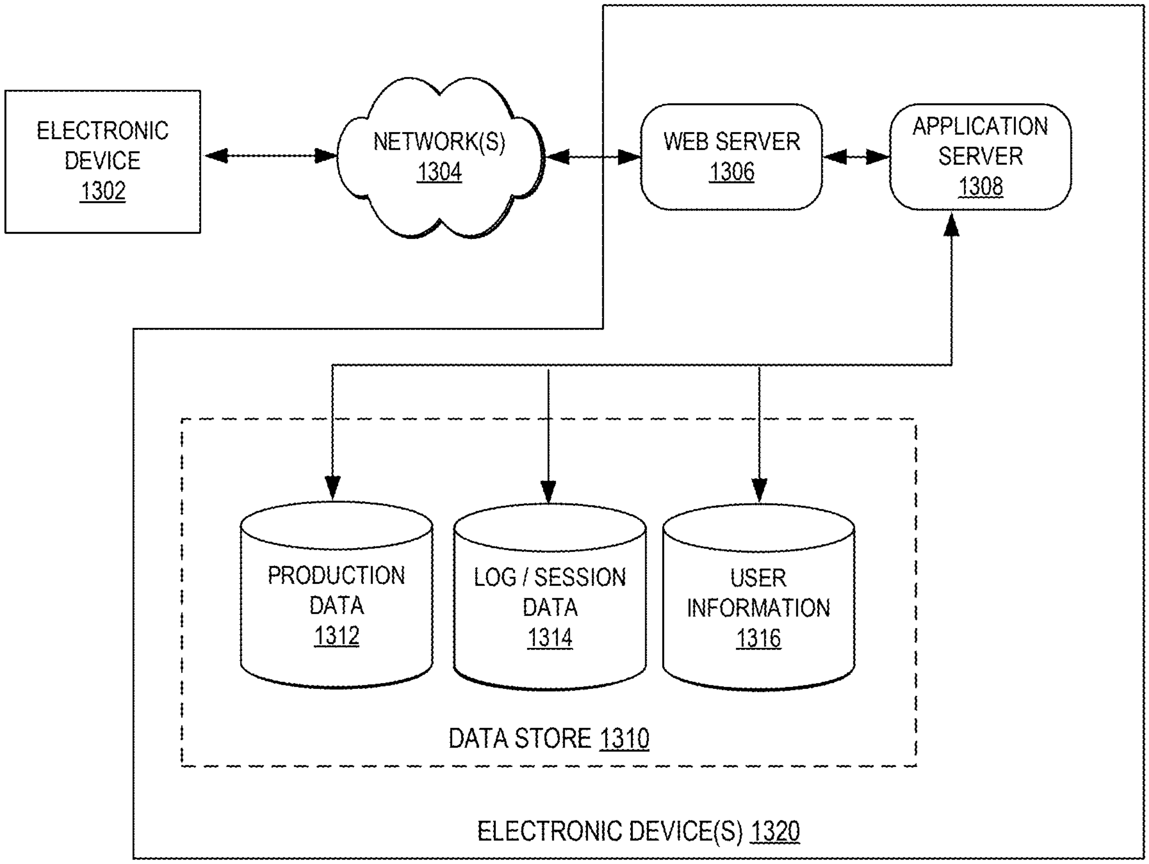
FIG. 13 illustrates an example of an environment for implementing aspects in accordance with various examples.

As discussed, different approaches can be implemented in various environments in accordance with the described examples. For example, FIG. 13 illustrates an example of an environment 1300 for implementing aspects in accordance with various examples. For example, in some examples messages are HyperText Transfer Protocol (HTTP) requests that are received by a web server (e.g., web server 1306), and the users, via electronic devices, may interact with the provider network via a web portal provided via the web server 1306 and application server 1308. As will be appreciated, although a web-based environment is used for purposes of explanation, different environments may be used, as appropriate, to implement various examples. The system includes an electronic client device 1302, which may also be referred to as a client device and can be any appropriate device operable to send and receive requests, messages, or information over an appropriate network 1304 and convey information back to a user of the device 1302. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1304 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1304 includes the Internet, as the environment includes a web server 1306 for receiving requests and serving content in response thereto, although for other networks an alternative device serving a similar purpose could be used, as would be apparent to one of ordinary skill in the art.

The illustrative environment includes at least one application server 1308 and a data store 1310. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server 1308 can include any appropriate hardware and software for integrating with the data store 1310 as needed to execute aspects of one or more applications for the client device 1302 and handling a majority of the data access and business logic for an application. The application server 1308 provides access control services in cooperation with the data store 1310 and is able to generate content such as text, graphics, audio, video, etc., to be transferred to the client device 1302, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1302 and the application server 1308, can be handled by the web server 1306. It should be understood that the web server 1306 and application server 1308 are not required and are merely example components, as structured code discussed herein can be executed on any appropriate device or host machine as discussed elsewhere herein.

The data store 1310 can include several separate data tables, databases, or other data storage mechanisms and media for storing data relating to a particular aspect. For example, the data store illustrated includes mechanisms for storing production data 1312 and user information 1316, which can be used to serve content for the production side. The data store 1310 also is shown to include a mechanism for storing log or session data 1314. It should be understood that there can be many other aspects that may need to be stored in the data store, such as page image information and access rights information, which can be stored in any of the above listed mechanisms as appropriate or in additional mechanisms in the data store 1310. The data store 1310 is operable, through logic associated therewith, to receive instructions from the application server 1308 and obtain, update, or otherwise process data in response thereto. In one example, a user might submit a search request for a certain type of item. In this case, the data store 1310 might access the user information 1316 to verify the identity of the user and can access a production data 1312 to obtain information about items of that type. The information can then be returned to the user, such as in a listing of results on a web page that the user is able to view via a browser on the user device 1302. Information for a particular item of interest can be viewed in a dedicated page or window of the browser.

The web server 1306, application server 1308, and/or data store 1310 may be implemented by one or more electronic devices 1320, which can also be referred to as electronic server devices or server end stations, and may or may not be located in different geographic locations. Each of the one or more electronic devices 1320 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one example is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the environment 1300 in FIG. 13 should be taken as being illustrative in nature and not limiting to the scope of the disclosure.

Various examples discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most examples utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of examples, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, services, or other elements located within at least one working memory device, including an operating system and application programs, such as a client application or web browser. It should be appreciated that alternate examples may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program code, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Bracketed text and blocks with dashed borders (e.g., large dashes, small dashes, dot-dash, and dots) are used herein to illustrate optional operations that add additional features to some examples. However, such notation should not be taken to mean that these are the only options or optional operations, and/or that blocks with solid borders are not optional in certain examples.

Reference numerals with suffix letters (e.g., 1018A-1018N) may be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given example requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:

receiving, by a conversational agent service, a search query from a user;

selecting, by the conversational agent service, a supplier from a plurality of suppliers based on a relevance of the supplier to the search query;

determining, by the conversational agent service, a plurality of aspects for the supplier based on a set of user reviews;

generating, in real time by one or more machine learning models of the conversational agent service, one or more contextually relevant aspects from the plurality of aspects based on the search query;

generating, in real time by the one or more machine learning models of the conversational agent service, a supplier related question and corresponding answer based on the one or more contextually relevant aspects; and presenting, by the conversational agent service, the supplier related question in real time and the corresponding answer to the user.

2. The computer-implemented method of claim 1, wherein the selecting the supplier comprises:

determining a corresponding predicted click-through value based on the search query for the plurality of suppliers; and determining the supplier based on the corresponding predicted click-through values.

3. The computer-implemented method of claim 1, wherein the presenting comprises:

presenting the supplier related question to the user; and presenting the corresponding answer in response to an indication received from the user.

4. A computer-implemented method comprising:

receiving an indication from a user;

determining a plurality of corresponding aspects for a plurality of suppliers based on a set of user based content;

generating, by one or more machine learning models, one or more contextually relevant aspects from the plurality of corresponding aspects based on the indication for individual ones of the plurality of suppliers;

generating, by the one or more machine learning models, a corresponding supplier related question for the individual ones of the plurality of suppliers based on the one or more contextually relevant aspects;

selecting a supplier related question from the corresponding supplier related questions;

generating, by the one or more machine learning models, a corresponding answer to the supplier related question based on one or more of the set of user based content; and causing the supplier related question and the corresponding answer to be presented the user.

5. The computer-implemented method of claim 4, wherein the supplier related question is for a product of the supplier.

6. The computer-implemented method of claim 4, wherein the generating, by the one or more machine learning models, the corresponding answer to the supplier related question is also based on an input of supplier guidelines into the one or more machine learning models.

7. The computer-implemented method of claim 4, wherein the selecting the supplier related question comprises:

determining a corresponding predicted click-through value for the indication for the corresponding supplier related questions; and determining the supplier related question based on the corresponding predicted click-through values.

8. The computer-implemented method of claim 4, wherein the indication is a search query from the user.

9. The computer-implemented method of claim 4, wherein the indication is an access of an online shopping page for a product.

10. The computer-implemented method of claim 4, further comprising updating a cached version of the set of user based content in response to receiving the indication.

11. The computer-implemented method of claim 4, wherein the causing the supplier related question and the corresponding answer to be presented the user comprises:

causing the supplier related question to be presented to the user; and causing the corresponding answer to be presented to the user in response to another indication received from the user.

12. The computer-implemented method of claim 4, further comprising causing one or more other questions generated by a conversational agent service to be presented to the user with the supplier related question.

13. The computer-implemented method of claim 12, further comprising ranking, by the one or more machine learning models, the supplier related question and the one or more other questions, and causing the supplier related question and the one or more other questions to be presented based on the ranking.

14. The computer-implemented method of claim 4, further comprising determining the one or more of the set of user based content, by the one or more machine learning models, based on the one or more contextually relevant aspects.

15. A non-transitory computer-readable medium storing code that, when executed by a device, causes the device to perform a method comprising:

in response to receiving an indication from a user, determining a plurality of corresponding aspects for a plurality of suppliers based on a set of user based content;

generating, by one or more machine learning models, one or more contextually relevant aspects from the plurality of corresponding aspects based on the indication for individual ones of the plurality of suppliers;

generating, by the one or more machine learning models, a corresponding supplier related question for the individual ones of the plurality of suppliers based on the one or more contextually relevant aspects;

selecting a supplier related question from the corresponding supplier related questions;

generating, by the one or more machine learning models, a corresponding answer to the supplier related question based on one or more of the set of user based content; and causing the supplier related question and the corresponding answer to be presented the user.

16. The non-transitory computer-readable medium of claim 15, wherein the selecting the supplier related question comprises:

determining a corresponding predicted click-through value for the indication for the corresponding supplier related questions; and determining the supplier related question based on the corresponding predicted click-through values.

17. The non-transitory computer-readable medium of claim 15, wherein the method further comprises updating a cached version of the set of user based content in response to receiving the indication.

18. The non-transitory computer-readable medium of claim 15, wherein the causing the supplier related question and the corresponding answer to be presented the user comprises:

causing the supplier related question to be presented to the user; and causing the corresponding answer to be presented to the user in response to another indication received from the user.

19. The non-transitory computer-readable medium of claim 15, wherein the method further comprises causing one or more other questions generated by a conversational agent service to be presented to the user with the supplier related question.

20. The non-transitory computer-readable medium of claim 19, wherein the method further comprises ranking, by the one or more machine learning models, the supplier related question and the one or more other questions, and causing the supplier related question and the one or more other questions to be presented based on the ranking.

* * * * *